(12) United States Patent
Tanaka et al.

(10) Patent No.: US 10,450,407 B2
(45) Date of Patent: Oct. 22, 2019

(54) COATED PARTICLES

(71) Applicant: AJINOMOTO CO., INC., Chuo-ku (JP)

(72) Inventors: Takayuki Tanaka, Kawasaki (JP); Eriko Satou, Kawasaki (JP); Yuji Koshima, Kawasaki (JP); Junji Ohashi, Kawasaki (JP)

(73) Assignee: Ajinomoto Co., Inc., Chuo-ku (JP)

( * ) Notice: Subject to any disclaimer, the term of this patent is extended or adjusted under 35 U.S.C. 154(b) by 253 days.

(21) Appl. No.: 15/349,491

(22) Filed: Nov. 11, 2016

(65) Prior Publication Data
US 2017/0137563 A1 May 18, 2017

(30) Foreign Application Priority Data

Nov. 13, 2015 (JP) ................. 2015-223203
May 26, 2016 (JP) ................. 2016-105419

(51) Int. Cl.
  *C08G 59/50* (2006.01)
  *C09J 163/00* (2006.01)
  *C08K 5/14* (2006.01)
  *H01B 1/22* (2006.01)
  *C09K 5/14* (2006.01)

(52) U.S. Cl.
  CPC ........ *C08G 59/5073* (2013.01); *C09J 163/00* (2013.01); *C09K 5/14* (2013.01); *H01B 1/22* (2013.01)

(58) Field of Classification Search
  CPC ...... C08G 59/5073; C09J 163/00; C08K 5/14; H01B 1/22
  USPC .......................................... 525/404; 523/404
  See application file for complete search history.

(56) References Cited

FOREIGN PATENT DOCUMENTS

| JP | 2005-222037 | | 8/2005 | | |
| JP | 2007204669 A | * | 8/2007 | ............. | C08G 59/50 |
| JP | 2010254775 A | * | 11/2010 | ............... | C08J 9/06 |

OTHER PUBLICATIONS

Yoshikawa et al., JP 2010-254775 A machine translation in English, Nov. 11, 2010 (Year: 2010).*
Omi et al., JP 2007-204669 A machine translation in English, Aug. 16, 2007 (Year: 2007).*

* cited by examiner

*Primary Examiner* — David T Karst
(74) *Attorney, Agent, or Firm* — Oblon, McClelland, Maier & Neustadt, L.L.P.

(57) ABSTRACT

An object of the present invention is to provide curing agent composite particles for epoxy resin, which are less likely to aggregate, and are excellent in storage stability and solvent resistance. Coated particles of the present invention comprise (A) curing agent particles for epoxy resin, and (B) an alkoxy oligomer, wherein the surfaces of the curing agents for epoxy resin particle are coated with the alkoxy oligomer.

19 Claims, No Drawings

COATED PARTICLES

TECHNICAL FIELD

The present invention relates to coated particles containing (A) curing agent particles for epoxy resin and (B) an alkoxy oligomer, wherein the surfaces of the curing agent particles for epoxy resin are coated with the alkoxy oligomer. The present invention preferably relates to coated particles which are less likely to aggregate, and are excellent in acid anhydride resistance and solvent resistance.

BACKGROUND ART

In the case where an epoxy resin composition containing a solid curing agent for epoxy resin is used as an adhesive agent or the like, the solid curing agent for epoxy resin is required to have latency good enough to keep the epoxy resin composition in a one-component state. Here, the latency is a property in which a curing agent does not act as the curing agent at a normal temperature but acts as the curing agent when heated. If the latency of the solid curing agent for epoxy resin is insufficient, the curing reaction of the epoxy resin proceeds at a normal temperature, and the viscosity of the epoxy resin composition increases. If the epoxy resin composition contains an acid anhydride or an organic solvent, the acid anhydride or the organic solvent dissolves the solid curing agent for epoxy resin and thereby causes a problem in that the latency of the solid curing agent for epoxy resin is lowered.

As a method for imparting latency to a curing agent, a method for treating a curing agent with a silane coupling agent such as y-glycidoxypropyltrimethoxysilane or with the like has been studied so far (for example, Patent Literature 1), but is still required to improve in terms of the acid anhydride resistance and the solvent resistance.

Meanwhile, in the case where a curing agent containing fine particles is treated by a dry treatment method not using a solvent, a problem has been found in that an aggregation occurs in the solid curing agent for epoxy resin.

CITATION LIST

Patent Literature

[Patent Literature 1] Japanese Patent Application Publication No. 2005-222037

SUMMARY OF INVENTION

Technical Problems

An object to be achieved by the present invention is to provide coated particles which are less likely to aggregate, and are excellent in acid anhydride resistance and solvent resistance.

Solution to Problems

The present inventors have earnestly studied in order to achieve the foregoing object, and have consequently completed the present invention by finding that coated particles which are less likely to aggregate, and are excellent in acid anhydride resistance and solvent resistance can be obtained by coating the surfaces of curing agent particles for epoxy resin with an alkoxy oligomer.

More specifically, the present invention includes the following aspects.

<1> Coated particles comprising: (A) curing agent particles for epoxy resin; and (B) an alkoxy oligomer, wherein the surfaces of the curing agent particles for epoxy resin are coated with the alkoxy oligomer.

<2> The coated particles according to the above aspect <1>, in which the (A) curing agent particles for epoxy resin are a latent curing agent.

<3> The coated particles according to the above aspect <1> or <2>, in which the (A) curing agent particles for epoxy resin are at least one selected from the group consisting of amine-based latent curing agents, urea compounds, dicyandiamide, and hydrazide compounds.

<4> The coated particles according to the above aspect <3>, in which the (A) curing agent particles for epoxy resin are at least one amine-based latent curing agent selected from the group consisting of tertiary amine-adduct latent curing agents and imidazole-adduct latent curing agents.

<5> The coated particles according to anyone of the above aspects <1> to <4>, in which an average particle diameter D of the coated particles is not less than 1.0 times to not more than 5.0 times an average particle diameter of the (A) curing agent particles for epoxy resin.

<6> The coated particles according to any one of the above aspects <1> to <5>, in which an average particle diameter D of the coated particles satisfies 2.5 μm≤D≤12.5 μm.

<7> The coated particles according to any one of the above aspects <1> to <6>, in which an amount of the (B) alkoxy oligomer is 0.1 to 40% by mass relative to 100% by mass of the (A) curing agent particles for epoxy resin.

<8> The coated particles according to any one of the above aspects <1> to <7>, in which an amount of the (B) alkoxy oligomer per unit surface area of the (A) curing agent particles for epoxy resin is 0.5 mg/m$^2$ or more.

<9> The coated particles according to any one of the above aspects <1> to <8>, in which a $SiO_2$ content in the coated particles is 0.04 to 11% by mass relative to 100% by mass of the coated particles.

<10> The coated particles according to any one of the above aspects <1> to <9>, in which the (B) alkoxy oligomer has a viscosity (25° C.) of 10 mm$^2$/s to 200 mm$^2$/s.

<11> The coated particles according to any one of the above aspects <1> to <10>, in which the (B) alkoxy oligomer is at least one selected from the group consisting of glycidoxy alkyl group-containing alkoxysilyl resins, aminoalkyl group-containing alkoxysilyl resins and mercaptoalkyl group-containing alkoxysilyl resins.

<12> The coated particles according to the above aspect <11>, in which the (B) alkoxy oligomer is at least one selected from the group consisting of glycidoxypropyl group-containing alkoxysilyl resins, aminopropyl group-containing alkoxysilyl resins, N-2-(aminoethyl)-3-aminopropyl group-containing alkoxysilyl resins, N-phenyl-3-aminopropyl group-containing alkoxysilyl resins, and mercaptopropyl group-containing alkoxysilyl resins.

<13> The coated particles according to the above aspect <12>, in which the (B) alkoxy oligomer is at least one selected from the group consisting of glycidoxypropyl group-containing methoxysilyl resins, aminopropyl group-containing methoxysilyl resins, aminopropyl group-containing ethoxysilyl resins, N-2-(aminoethyl)-3-aminopropyl group-containing methoxysilyl resins, N-phenyl-3-aminopropyl group-containing methoxysilyl resins, and mercaptopropyl group-containing methoxysilyl resins.

<14> The coated particles according to anyone of the above aspects <1> to <10>, in which the (B) alkoxy oligomer is represented by the following general formula (1):

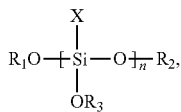

where $R_1$, $R_2$, and $R_3$ are each independently a linear or branched chain alkyl group having 1> to <10 carbon atoms, X is a lower alkyl group, a glycidoxyalkyl group, an aminoalkyl group, or a mercaptoalkyl group, n is an integer of 2> to <10, a plurality of X present may be the same as or different from each other, a plurality of $R_3$ present may be the same as or different from each other, and at least one of the plurality of X is a glycidoxyalkyl group, an aminoalkyl group, or a mercaptoalkyl group.

<15> An epoxy resin composition comprising: the coated particles according to any one of the above aspects <1> to <14>; and an epoxy resin.

<16> The resin composition according to the above aspect <15, further comprising at least one selected from the group consisting of curing agents, curing accelerators, thermosetting resins, thermoplastic resins, inorganic fillers, organic fillers, thickeners, defoaming agents, leveling agents, adhesion imparting agents, coloring agents, and organic solvents.

<17> The resin composition according to the above aspect <15> or <16>, comprising an inorganic filler, in which the inorganic filler is at least one selected from the group consisting of silica, electrically conductive fillers, magnetic fillers, and thermally conductive fillers.

<18> The resin composition according to any one of the above aspects <15> to <17>, in which the resin composition is a liquid, paste, or film composition.

<19> The resin composition according to any one of the above aspects <15> to <18>, in which the resin composition is an adhesive agent, a bonding agent, an electrically conductive material, a magnetic material, a thermally conductive material, an insulating materials, an encapsulation material, a coating material, or a paint.

<20> A sheet material or a composite material comprising the resin composition according to any one of the above aspects <15> to <19>.

Advantageous Effect of the Invention

Coated particles of the present invention are less likely to aggregate, and are excellent in acid anhydride resistance and solvent resistance.

DESCRIPTION Of EMBODIMENTS

The present invention relates to coated particles containing (A) curing agent particles for epoxy resin and (B) an alkoxy oligomer coating the surfaces of the curing agent particles for epoxy resin.
(A) Curing Agent Particles for Epoxy Resin (A) Curing agent particles for epoxy resin of the present invention are preferably of a latent curing agent. The latency is a property in which the agent does not act as the curing agent at a normal temperature (25° C.) but acts as the curing agent when heated to, for example, 100° C. The (A) curing agent particles for epoxy resin may be of at least one selected from the group consisting of amine-based latent curing agents, urea compounds, dicyandiamide, and hydrazide compounds, for example. From the viewpoint of curability, it is preferable that the (A) curing agent particles be of at least one amine-based latent curing agent selected from the group consisting of tertiary amine-adduct latent curing agents and imidazole-adduct latent curing agents.
Tertiary Amine-Adduct Latent Curing Agent The tertiary amine-adduct latent curing agent is a compound obtained by reacting a tertiary amino group-containing compound with an epoxy compound. Moreover, the surface of the tertiary amino group-containing compound may be treated with an isocyanate compound, an acidic compound, or the like.

Preferable examples as the tertiary amino group-containing compound include dimethylaminopropylamine, diethylaminopropylamine, di-n-propylaminopropylamine, dibutylaminopropylamine, dimethylaminoethylamine, diethylaminoethylamine, N-methylpiperazine, N-aminoethylpiperazine, 1,4-bis(3-aminopropyl)piperazine, 2-dimethylaminoethanol, 1-methyl-2-dimethylaminoethanol, 1-phenoxymethyl-2-dimethylaminoethanol, 2-diethylaminoethanol, 1-butoxymethyl-2-dimethylaminoethanol, dimethylaminomethylphenol, 2,4,6-tris(dimethylaminomethyl)phenol, N-β-hydroxyethyl horumorin, 2-dimethylaminoethanethiol, 1,4-diazabicyclo[2.2.2]octane, N,N-dimethyl-N'-phenylurea, N,N-dimethyl-N'-(3,4-dichlorophenyl)urea, toluene bis (dimethyl urea), 4,4 methylene bis (phenyl dimethyl urea), 2-mercaptopyridine, N,N-dimethylamino benzoic acid, N,N-dimethyl glycine, nicotinic acid, isonicotinic acid, picolinic acid, N,N-dimethylglycine hydrazide, N,N-dimethyl-propionic acid hydrazide, nicotinic acid hydrazide, isonicotinic acid hydrazide, and the like.

Preferable epoxy compounds usable as a martial for producing the tertiary amine-adduct latent curing agent include, for example, a polyglycidyl ester obtained by reacting a polyhydric phenol such as bisphenol A, bisphenol F, catechol, or resorcinol, or a polyhydric alcohol such as glycerin or polyethylene glycol with epichlorohydrin; a glycidylether ester obtained by reacting a hydroxy carboxylic acid such as a p-hydroxybenzoic acid or a β-hydroxynaphthoic acid with epichlorohydrin; a polyglycidyl ester obtained by reacting a polycarboxylic acid such as a phthalic acid or a terephthalic acid with epichlorohydrin; and a glycidyl amine compound obtained by reacting 4,4'-diaminodiphenylmethane, m-aminophenol, or the like with epichlorohydrin; and further include: a multifunctional epoxy compound such as epoxidized phenol novolac resin, epoxidized cresol novolac resin, or epoxidized polyolefin; a monofunctional epoxy compound such as butyl glycidyl ether, phenyl glycidyl ether, or glycidyl methacrylate; and the like. However, the present invention is not limited at all to the above.

In producing the tertiary amine-adduct latent curing agent, an active hydrogen compound having active hydrogen in the molecule, a diisocyanate, a monoamine compound, a diamine compound, urea, or the like maybe added as another ingredient. Examples of the active hydrogen compound include: polyhydric phenols such as bisphenol A, bisphenol F, bisphenol S, hydroquinone, catechol, resorcinol, pyrogallol, and phenol novolac resin; polyhydric alcohols such as trimethylolpropane; polycarboxylic acids such as adipic acid and phthalic acid; 1,2-dimercapto ethane; 2-mercaptoethanol; 1-mercapto-3-phenoxy-2-propanol; mercapto acetic acid; anthranilic acid, lactic acid; and the like. As the diisocyanate, there are isophorone diisocyanate, meta-xylylene diisocyanate, 1,3-bis(isocyanatomethyl)cyclohexane, 2,4-toluylene diisocyanate, 2,6-toluylene diisocyanate, 1,5-naphthylene diisocyanate, 1,4-phenylene diisocyanate, diphenylmethane-4,4'-diisocyanate, 2,2'-dimethyldiphenylmethane-4,4'-diisocyanate, hexamethylene diisocyanate, trimethyl hexamethylene diisocyanate, and the like. As the monoamine compound, there are butylamine, isobutylamine, secondary butylamine, 1,2-dimethylpropyl amine, hexylamine, 2-ethylhexylamine, benzylamine, cyclohexyl amine, and the like. As the diamine compound, there are, for example, m-xylylenediamine, 1,3-bis amino methyl cyclohexane, isophorone diamine, diaminocyclohexane, phenylenediamine, toluylenediamine, diaminodiphenylmethane, diaminodiphenylsulfone, hexamethylene diamine, ethylene diamine, propylene diamine, diaminobutane, 1,12-dodecane diamine, piperazine, N-aminoethylpiperazine, and the like.

Further, the tertiary amine-adduct latent curing agent maybe surface-treated additionally. In the surface treatment, it is more preferable to use an isocyanate compound or an acidic compound. Preferable examples of isocyanate compounds usable as an agent for the surface treatment include: monofunctional isocyanate compounds such as n-butyl isocyanate, isopropyl isocyanate, phenyl isocyanate, and benzyl isocyanate; polyfunctional isocyanate compounds such as hexamethylene diisocyanate, toluylene diisocyanate, 1,5-naphthalene diisocyanate, diphenylmethane-4,4'-diisocyanate, isophorone diisocyanate, xylylene diisocyanate, paraphenylene diisocyanate, 1,3,6-hexamethylene triisocyanate, and bicycloheptane triisocyanate; a terminal isocyanate group-containing compound obtained by reacting any of the above polyfunctional isocyanate compounds with an active hydrogen compound; and the like. Preferable compounds as the above terminal isocyanate group-containing compound include a terminal isocyanate group-containing adduct obtained by a reaction of toluylene diisocyanate with trimethylolpropane, a terminal isocyanate group-containing adduct obtained by a reaction of toluylene diisocyanate with pentaerythritol, and the like.

Preferable acidic compounds usable as the agent for the surface treatment include gases and liquids of inorganic acids and organic acids. Preferable examples of the acidic compound include carbonic acid gas, sulfurous acid gas, sulfuric acid, hydrochloric acid, oxalic acid, phosphoric acid, acetic acid, formic acid, propionic acid, adipic acid, caproic acid, lactic acid, succinic acid, tartaric acid, sebacic acid, p-toluenesulfonic acid, salicylic acid, boric acid, tannin acid, alginic acid, polyacrylic acid, polymethacrylic acid, phenol, pyrogallol, phenol resin, resorcinol resin, and the like.

The tertiary amine-adduct latent curing agent is easily prepared by a method including mixing the aforementioned tertiary amino group-containing compound, an epoxy compound, and other ingredients as needed, followed by a reaction at a temperature range from a room temperature (25° C.) to 250° C., and then solidifying and pulverizing the reaction product; a method including reacting a mixture of the ingredients mentioned above in a solvent such as methyl ethyl ketone, dioxane, or tetrahydrofuran, followed by desolvation, and then pulverizing the remaining solids; or other similar methods. Further, the surface treatment of the reaction product can be carried out by bringing the reaction product into contact with any of the aforementioned isocyanate compounds and acidic compounds in a solvent such as methyl ethyl ketone or toluene, or without a solvent.

Imidazole-Adduct Latent Curing Agent

The imidazole-adduct latent curing agent is a curing agent other than the tertiary amine-adduct latent curing agent, and is a compound obtained by reacting an imidazole compound with an epoxy compound.

The imidazole compound is, for example, 2-ethyl-4-methylimidazole, 2-methylimidazole, 2-ethyl-4-methyl imidazoline, 2,4-dimethyl imidazoline, 1-(2-hydroxy-3-phenoxypropyl)-2-methylimidazole, 1-(2-hydroxy-3-phenoxypropyl)-2-ethyl-4-methylimidazole, 1-(2-hydroxy-3-butoxypropyl)-2-methylimidazole, 1-(2-hydroxy-3-butoxypropyl)2-ethyl-4-methylimidazole, 1-(2-hydroxy-3-phenoxypropyl)-2-phenyl imidazoline, 1-(2-hydroxy-3-butoxypropyl)-2-methyl imidazoline, or the like.

Materials usable for producing the imidazole-adduct latent curing agent include the aforementioned imidazole compounds, the epoxy compounds usable as a material for producing the tertiary amine-adduct latent curing agent, and other ingredients as needed.

The (A) curing agent particles for epoxy resin are particles having an average particle diameter of 0.5 to 12.5 µm, for example. The average particle diameter is preferably 1 to 10 µm, more preferably 1.5 to 7 µm, or even more preferably 2 to 5 µm. In this specification, unless otherwise indicated, the average particle diameter means a particle diameter at 50% cumulative from the fine side in a cumulative particle size distribution (median diameter). If the average particle diameter of the (A) curing agent particles for epoxy resin is 0.5 µm or more, the coated particles have latency good enough to prevent a situation where the handling-easiness of the epoxy resin composition containing the coating particles is deteriorated due to an increase in the viscosity of the epoxy resin composition at a normal temperature. If the average particle diameter of the (A) curing agent particles for epoxy resin is 12.5 µm or less, the epoxy resin composition containing the coated particles may be suitably used in a narrow gap as well. The average particle diameter can be measured by a laser diffraction particle size distribution analyzer (SALD-2200 manufactured by Shimadzu Corporation).

The (A) curing agent particles for epoxy resin with a desired particle diameter may be obtained by appropriately pulverizing coarse particles of the curing agent for epoxy resin with a mill such as a jet mill, a ball mill, an attritor, or a bead mill, and then classifying the resultant particles by a classifier such as an air separator, a cyclone, or a sieve as needed.

Further, from the viewpoint of use as a curing agent, d90/d50 of the (A) curing agent particles for epoxy resin is preferably 1.0 to 4.0, and more preferably 1.0 to 3.0, where d50 and d90 denote the particle diameters at 50% cumulative and 90% cumulative, respectively, from the fine side in the cumulative particle size distribution.

From the viewpoint of dispersibility of the coated particles into the epoxy resin, the specific surface area of the (A) curing agent particles for epoxy resin is preferably 0.1 to 10 $m^2/g$, more preferably 0.2 to 7.5 $m^2/g$, or even more preferably 0.3 to 5 $m^2/g$. The specific surface area can be calculated in accordance with the following equation:

Specific surface area [$m^2/g$]=6/((Density)*(Average Particle Diameter))

Here, the density can be measured by the Ultra pycnometer 1000 (Quantachrome Instruments Co., Ltd.).

Commercially available products may be used as the (A) curing agent particles for epoxy resin. As the commercially available curing agent particles for epoxy resin, there are imidazole-adduct latent curing agent (for example, AJI- CURE PN-23, AJICURE PN-23J, AJICURE PN-31, AJI-CURE PN-31J, AJICURE PN-40, AJICURE PN-40J, AJI-CURE PN-50, AJICURE PN-50J, and AJICURE PN-H fabricated by Ajinomoto Fine-Techno Co., Inc.; Adeka hardener EH3293S, Adeka hardener EH3366S, and Adeka hardener EH4346S fabricated by ADEKA CORPORATION; Sunmide LH-210 fabricated by Air Products Japan, Inc.; FXR-1121 fabricated by T&K TOKA Corporation; and the like) and tertiary amine-adduct latent curing agents (for example, AJICURE MY-24, AJICURE MY-H, AJICURE MY-24J, and AJICURE MY-HK-1 fabricated byAjinomoto Fine-Techno Co., Inc.; EH4380S, EH3616S, EH5001P, EH4357S, and EH3615S fabricated by ADEKA CORPORATION; FXR-1020 and FXR-1081 fabricated by T&K TOKA Corporation; and the like).

From the viewpoint of improvements of acid anhydride resistance and solvent resistance, and from the viewpoint of aggregation prevention, the (A) curing agent particles for epoxy resin are contained in an amount of preferably 71.4 to 99.9% by mass, more preferably 76.9 to 99.7% by mass, or even more preferably 80.0 to 99.5% by mass, relative to 100% by mass of the coated particles.

(B) Alkoxy Oligomer

The (B) alkoxy oligomers usable in the present invention are, but are not limited to, low-molecular resins containing both an organic group and an alkoxysilyl group, and include methyl group-containing alkoxysilyl resins, phenyl group-containing alkoxysilyl resins, epoxy group-containing alkoxysilyl resins, mercapto group-containing alkoxysilyl resins, amino group-containing alkoxysilyl resins, acryl group-containing alkoxysilyl resins, methacryl group-containing alkoxysilyl resins, ureido group-containing alkoxysilyl resins, isocyanate group-containing alkoxysilyl resins, vinyl group-containing alkoxysilyl resins, and the like. Among them, the epoxy group-containing alkoxysilyl resins, the mercapto group-containing alkoxysilyl resins, and the amino group-containing alkoxysilyl resins are preferable. These resins may be used singly or be used in a combination of two or more kinds. The alkoxy oligomer may contain one or more organic groups.

Specifically, the (B) alkoxy oligomers are glycidoxypropyl group-containing alkoxysilyl resins, aminopropyl group-containing alkoxysilyl resins, N-2-(aminoethyl)-3-aminopropyl group-containing alkoxysilyl resins, N-phenyl-3-aminopropyl group-containing alkoxysilyl resins, methacryloxypropyl group-containing alkoxysilyl resins, acryloxypropyl group-containing alkoxysilyl resins, mercaptopropyl group-containing alkoxysilyl resins, ureidopropyl group-containing alkoxysilyl resins, isocyanatepropyl group-containing alkoxysilyl resins, and the like. Preferable resins are the glycidoxypropyl group-containing alkoxysilyl resins, 3-aminopropyl group-containing alkoxysilyl resins, the N-2-(aminoethyl)-3-aminopropyl group-containing alkoxysilyl resins, the N-phenyl-3-aminopropyl group-containing alkoxysilyl resins, and the mercaptopropyl group-containing alkoxysilyl resins.

More specifically, the (B) alkoxy oligomers are glycidoxypropyl group-containing methoxysilyl resins, aminopropyl group-containing methoxysilyl resins, aminopropyl group-containing ethoxysilyl resins, N-2-(aminoethyl)-3-aminopropyl group-containing methoxysilyl resins, N-phenyl-3-aminopropyl group-containing methoxysilyl resins, methacryloxypropyl group-containing methoxysilyl resins, acryloxypropyl group-containing methoxysilyl resins, mercaptopropyl group-containing methoxysilyl resins, ureidopropyl group-containing ethoxysilyl resins, isocyanatepropyl group-containing ethoxysilyl resins, and the like.

The preferable resins are the glycidoxypropyl group-containing methoxysilyl resins, the aminopropyl group-containing methoxysilyl resins, the aminopropyl group-containing ethoxysilyl resins, the N-2-(aminoethyl)-3-aminopropyl group-containing methoxysilyl resins, N-phenyl-3-aminopropyl group-containing methoxysilyl resins, and the mercaptopropyl group-containing methoxysilyl resins.

To be more specific, the (B) alkoxy oligomer can be represented by the following general formula (1):

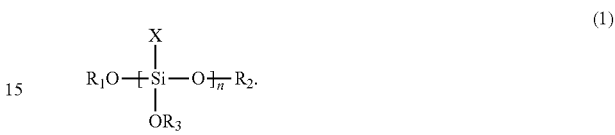

$$R_1O\text{-}\!\!\left[\!\!\begin{array}{c}X\\|\\Si\\|\\OR_3\end{array}\!\!-O\right]_{\!\!n}\!\!R_2. \tag{1}$$

In the formula (1), $R_1$, $R_2$, and $R_3$ are each independently a linear or branched chain alkyl group having 1 to 10 carbon atoms, preferably an alkyl group having a linear or branched chain having 1 to 5 carbon atoms, more preferably an alkyl group having a linear or branched chain having 1 to 4 carbon atoms, even more preferably a methyl group, an ethyl group, a propyl group, an isopropyl group, a 1-methylpropyl group, a butyl group, an isobutyl group, or a tert-butyl group, even much more preferably a methyl group, an ethyl group, a propyl group, or an isopropyl group, or especially preferably a methyl group or an ethyl group. A plurality of $R_3$ present may be the same as or different from each other.

In the formula (1), X is a lower alkyl group, a glycidoxyalkyl group, an aminoalkyl group, a mercaptoalkyl group, an acryloxyalkyl group, a methacryloxyalkyl group, an ureidoalkyl group, an isocyanatealkyl group, or a vinylalkyl group, preferably is a glycidoxypropyl group, an aminopropyl group, an N-2-(aminoethyl)-3-aminopropyl group, an N-phenyl-3-aminopropyl group, a methacryloxypropyl group, an acryloxypropyl group, a mercaptopropyl group, an ureidopropyl group, or an isocyanatepropyl gruop, and more preferably is the glycidoxypropyl group, a 3-aminopropyl group, a N-2-(aminoethyl)-3-aminopropyl group, a N-phenyl-3-aminopropyl group, and a mercaptopropyl group. X may include one or more kinds. In other words, a plurality of X present may be the same as or different from each other.

In the formula (1), n is an integer of 2 to 10, preferably an integer of 2 to 8, more preferably an integer of 2 to 6, and even more preferably an integer of 3 to 5.

From the viewpoint of handling-easiness improvement by reducing the volatility, from the viewpoint of dispersibility improvement, and from the viewpoint of reduction in an amount of alcohol by-produced by hydrolysis, the average molecular mass of the (B) alkoxy oligomer is preferably 350 to 20,000, more preferably 400 to 15,000, and even more preferably 500 to 10,000. The average molecular mass in the present invention is measured by a gel permeation chromatography (GPC) method (in terms of polystyrene). Specifically, in the GPC method, a measurement is conducted at a column temperature 40° C. using Shodex GPC-101 manufactured by Showa Denko K.K. as a measurement device, using Shodex KF-800R manufactured by Showa Denko K.K. as a column, and using THF or the like as a mobile phase, and then the average molecular mass is calculated from a calibration curve of standard polystyrene obtained by the measurement.

From the viewpoint of handling-easiness improvement by preventing the volatilization, the viscosity of the (B) alkoxy oligomer (25° C.) is preferably 10 mm$^2$/s or more, more preferably 11 mm²/s or more, and even more preferably 12 mm²/s or more. On the other hand, from the viewpoint of efficient coating of the curing agent particles for epoxy resin, the viscosity of the (B) alkoxy oligomer (25° C.) is preferably 200 mm²/s or less, more preferably 150 mm²/s or less, or even more preferably 100 mm²/s or less. The viscosity (25° C.) in the present invention can be measured using an E-type viscometer (RE-80 manufactured by Toki Sangyo Co., Ltd.) under conditions in which the alkoxy oligomer is measured at about 0.2 ml and set by a syringe in the viscometer adjusted to 25° C. and the rotation speed is set to 5 to 20 rpm.

From the viewpoint of improvements of the acid anhydride resistance and the solvent resistance, a $SiO_2$ content in the (B) alkoxy oligomer is preferably 10 to 90% by mass, more preferably 20 to 80% by mass, and even more preferably 30 to 75% by mass relative to 100% by mass of the (B) alkoxy oligomer.

A method for producing the alkoxy oligomer is not particularly limited, and the alkoxy oligomer can be produced by a publicly-known method such as one disclosed in Japanese Patent No. 3474007. Specifically, the alkoxy oligomer can be obtained by a reaction in which alkoxy groups in a silane coupling agent, which is of a monomer, are partially hydrolyzed and polycondednsed. For example, a silane coupling agent and an organic solvent are put into a reaction vessel, and a hydrolysis and condensation reaction is conducted at 20° C. to 80° C. for 0.1 to 10 hours. In this process, an aqueous solution of hydrochloric acid, a fluorine-containing compound, or the like may also be used as a catalyst. After the reaction, the catalyst used is removed by filtering after the by-produced alcohol is distilled off, or by washing with water after changing to a highly hydrophobic organic solvent system. For trace water in the product, a publicly-known post-treatment method can be employed such as removal with a drying agent or azeotropic dehydration, followed by volatilization of the solvent.

Commercially available alkoxy oligomers may be used. There are commercially available alkoxy oligomers such as epoxy group-containing alkoxysilyl resins ("X-41-1053" and "X-41-1059A" fabricated by Shin-Etsu Chemical Co., Ltd.), a methyl group-containing and epoxy group-containing alkoxysilyl resin ("X-41-1056" fabricated by Shin-Etsu Chemical Co., Ltd.), a primary amino group-containing alkoxysilyl resin ("X-40-2651" fabricated by Shin-Etsu Chemical Co., Ltd.), an amino phenyl group-containing alkoxysilyl resin ("X-40-9281" fabricated by Shin-Etsu Chemical Co., Ltd.), mercapto group-containing alkoxysilyl resins ("X-41-1805", "X-40-1805", and "X-41-1818" fabricated by Shin-Etsu Chemical Co., Ltd.), a methyl group-containing and mercapto group-containing alkoxysilyl resin ("X-41-1810" fabricated by Shin-Etsu Chemical Co., Ltd.), a methyl group-containing and amino group-containing alkoxysilyl resin ("X-40-2651" fabricated by Shin-Etsu Chemical Co., Ltd.), a methyl group-containing and methacryl group-containing alkoxysilyl resin ("X-40-2655A" fabricated by Shin-Etsu Chemical Co., Ltd.), a methyl group-containing and acrylic group-containing alkoxysilyl resin ("KR-513" fabricated by Shin-Etsu Chemical Co., Ltd.), methyl group-containing alkoxysilyl resins ("KC-89S", "KR-500", "X-40-9225", "X-40-9246", and "X-40-9250" fabricated by Shin-Etsu Chemical Co., Ltd.), and methyl group-containing and phenyl group-containing alkoxysilyl resins ("KR-401N", "X-40-9227", "X-40-9247", "KR-510", and "KR-9218", and "KR-213" fabricated by Shin-Etsu Chemical Co., Ltd.).

From the viewpoint of improvements of the acid anhydride resistance and the solvent resistance, and from the viewpoint of aggregation prevention, the (B) alkoxy oligomer is contained in the coated particles in an amount of preferably from 0.1 to 40% by mass, more preferably 0.3 to 30% by mass, or even more preferably 0.5 to 20% by mass relative to 100% by mass of the coated particles.

From the viewpoint of improvement of the acid anhydride resistance and the solvent resistance, and from the viewpoint of aggregation prevention, the (B) alkoxy oligomer is contained in the coated particles in an amount of preferably 0.1 to 40% by mass, more preferably 0.2 to 30% by mass, or even more preferably 0.4 to 25% by mass relative to the (A) curing agent particles for epoxy resin of 100% by mass.

The average particle diameter D of the coated particles of the present invention is preferably 2.5 µm≤D≤12.5 µm, more preferably 2.5 µm≤D≤10 µm, or even more preferably 2.5 µm≤D≤8.5 µm from the viewpoint of application to narrow gaps in the case of using the coated particles in an epoxy resin composition, or from the viewpoint of a viscosity increase in the case of using the coated particles in an epoxy resin composition. The average particle diameter can be measured by using a commercially available particle size distribution measurer, for example, a laser diffraction particle size distribution analyzer (SALD-2200 manufactured by Shimadzu Corporation).

In the coated particles of the present invention, an amount of the (B) alkoxy oligomer per unit surface area of the (A) curing agent particles for epoxy resin is preferably 0.5 mg/m² or more, more preferably 1.5 mg/m² or more, or even more preferably 2.5 mg/m² or more from the viewpoint of improvements of the acid anhydride resistance and the solvent resistance. In addition, the amount of the (B) alkoxy oligomer per unit surface area of the (A) curing agent particles for epoxy resin is preferably 150 mg/m² or less, more preferably 130 mg/m² or less, or even more preferably 110 mg/m² or less from the viewpoint of aggregation prevention.

From the viewpoint of improvements of the acid anhydride resistance and the solvent resistance, the $SiO_2$ content in the coated particles is preferably 0.04 to 11% by mass, more preferably 0.12 to 9% by mass, or even more preferably 0.2 to 6.5% by mass relative to 100% by mass of the coated particles. The $SiO_2$ content may be measured by the following method, for example.

The coated particles are first thoroughly washed with hexane, and then are dried under reduced pressure to obtain the washed coated particles. 500 mg of the washed coated particles are heated at 660° C. for 2 hours in an electric furnace. From the mass of $SiO_2$ obtained as ash, the $SiO_2$ content (% by mass) is calculated relative to 100% by mass of the coated particles.

A method for producing coated particles in the present invention is not particularly limited. For example, the coated particles can be produced by mixing the (A) curing agent particles for epoxy resin and the (B) alkoxy oligomer fully. For example, the coated particles can be produced using a mixer in a procedure including: preparatory mixing of the (A) curing agent particles for epoxy resin for 30 seconds to 5 minutes or preferably 1 minute to 3 minutes; addition of the (B) alkoxy oligomer over a period of, for example, 1 to 5 minutes or preferably 2 to 4 minutes; and thereafter mixing for, for example, 1 to 10 minutes or preferably 2 to 8 minutes.

The coated particles of the present invention may be mixed with an epoxy resin to produce the epoxy resin composition.

Epoxy Resin

An epoxy equivalent of the epoxy resin contained in the epoxy resin composition is, for example, preferably 50 to 1,000, more preferably 100 to 800, or even more preferably 150 to 600. If the epoxy equivalent of the epoxy resin is 50 or more, the epoxy resin composition is favorable because the viscosity does not become too low thanks to the low volatility, but is kept at a level easy to handle. On the other hand, if the epoxy equivalent of the epoxy resin is 1,000 or less, the viscosity is not too high, and therefore is favorable in terms of the handling easiness. Here, the epoxy equivalent is the mass of an epoxy resin containing 1 equivalent of epoxy group, and can be measured in accordance with, for example, JIS K 7236 (2009).

From the viewpoint of keeping high heat resistance and low moisture permeability or doing the like, preferable epoxy resins include bisphenol A type epoxy resins, bisphenol F type epoxy resins, bisphenol E type epoxy resins, bisphenol S type epoxy resins, bisphenol AF type epoxy resins, trisphenol type epoxy resins, biphenyl type epoxy resins, naphthol type epoxy resins, naphthalene type epoxy resins, phenol novolac type epoxy resins, cresol novolac type epoxy resins, bisphenol A novolac type epoxy resins, naphthol novolac type epoxy resins, anthracene type epoxy resins, epoxy resins having a butadiene structure, biphenyl aralkyl type epoxy resins, phenol aralkyl type epoxy resins, glycidyl amine type epoxy resins such as aromatic glycidyl amine type epoxy resins, phosphorus-containing epoxy resins, alicyclic epoxy resins, aliphatic epoxy resins, epoxy resins having a dicyclopentadiene structure, diglycidyl ethers of bisphenol, diglycidyl ethers of naphthalene diol, glycidyl ethers of phenols, and diglycidyl ethers of alcohols, as well as, alkyl-substituted derivatives, halides, hydrogen additives, and the like of these resins. More preferable epoxy resins are the bisphenol A type epoxy resins and the bisphenol F type epoxy resins, and even more preferable epoxy resins are the bisphenol A type epoxy resins.

Specific examples of such resins include bisphenol A type epoxy resins ("jER828EL", "jER827", and "jER1001" fabricated by Mitsubishi Chemical Corporation), a bisphenol F type epoxy resin ("jER807" fabricated by Mitsubishi Chemical Corporation), a bisphenol AF type epoxy resin ("ZX1059" fabricated by Tohto Kasei Co., Ltd.), naphthalene type epoxy resins ("HP-4700" and "HP-5000" fabricated by DIC Corporation), a phenol novolac type epoxy resin ("N-770" fabricated by DIC Corporation), a glycidyl amine type epoxy resin ("jER630" fabricated by Mitsubishi Chemical Corporation), a cresol novolac type epoxy resin ("N-695" fabricated by DIC Corporation), an alicyclic epoxy resin ("CEL2021P" fabricated by Daicel Corporation), an epoxy resin having a hydrogenated structure ("YX8000" fabricated by Mitsubishi Chemical Corporation), a multi-functional dicyclopentadiene type epoxy resin ("HP7200" fabricated by DIC Corporation), an epoxy resin having a butadiene structure ("PB-3600" fabricated by Daicel Corporation), epoxy resins having a biphenyl structure ("NC3000H" and "NC3000L" fabricated by Nippon Kayaku Co., Ltd., and "YX4000" fabricated by Mitsubishi Chemical Corporation), an aliphatic epoxy resin ("EX-216L" fabricated by Nagase ChemteX Corporation), and the like.

The epoxy resin may be a liquid resin or a solid resin. Instead, the epoxy resin may be a mixture of a liquid resin and a solid resin. Here, the "liquid" and "solid" refer to the states of an epoxy resin at a normal temperature (25° C.). From the viewpoints of coatability, processability, and adhesiveness, it is preferable that at least 10% by mass of the total epoxy resin used be a liquid epoxy resin.

As the liquid epoxy resin, preferable resins are bisphenol A type epoxy resins, bisphenol F type epoxy resins, bisphenol AF type epoxy resins, naphthalene type epoxy resins, glycidyl ester type epoxy resins, phenol novolac type epoxy resins, alicyclic epoxy resins having an ester skeleton, and epoxy resins having a butadiene structure. Specific examples of the liquid epoxy resins are: "HP4032", "HP4032D", and "HP4032SS" (naphthalene type epoxy resins) fabricated by DIC Corporation; "828US", "jER828EL" (bisphenol A type epoxy resins), "jER807" (a bisphenol F type epoxy resin), "jER152" (a phenol novolac type epoxy resin), and "YL7760" (a bisphenol AF type epoxy resin) fabricated by Mitsubishi Chemical Corporation; "ZX1059" (a mixture of a bisphenol A type epoxy resin and a bisphenol F type epoxy resin) fabricated by NIPPON STEEL & SUMIKIN CHEMICAL CO., LTD.; "EX-721" (a glycidyl ester type epoxy resin) fabricated by Nagase ChemteX Corporation; "Celoxide 2021P" (an epoxy resin having an ester skeleton) and "PB-3600" (an epoxy resin having a butadiene structure) fabricated by Daicel Corporation; and the like. These resins may be used singly, or may be used in a combination of two or more kinds.

As the solid epoxy resin, preferable resins are tetrafunctional naphthalene type epoxy resins, cresol novolac type epoxy resins, dicyclopentadiene type epoxy resins, trisphenol epoxy resins, naphthol type epoxy resins, biphenyl type epoxy resins, naphthylene ether type epoxy resins, anthracene type epoxy resins, bisphenol A type epoxy resins, and tetraphenyl ethane type epoxy resins. Specific examples of the solid epoxy resins are: "HP4032H" (a naphthalene type epoxy resin), "HP-4700" and "HP-4710" (tetrafunctional naphthalene type epoxy resins), "N-690" (a cresol novolac type epoxy resin), "N-695" (a cresol novolac type epoxy resin), "HP-7200" (a dicyclopentadiene type epoxy resin), and "HP-7200HH", "EXA7311", "EXA7311-G3", "EXA7311-G4", "EXA7311-G4S", "HP6000" (naphthylene ether type epoxy resins) fabricated by DIC Corporation; "EPPN-502H" (a tris phenol type epoxy resin), "NC7000L" (a naphthol novolac type epoxy resin), and "NC3000H", "NC3000", "NC3000L", and "NC3100" (biphenyl type epoxy resins) fabricated by Nippon Kayaku Co., Ltd.; "ESN475V" (a naphthol type epoxy resin), and "ESN485" (a naphthol novolac type epoxy resin) fabricated by NIPPON STEEL & SUMIKIN CHEMICAL CO., LTD.; "YX4000H" and "YL6121" (biphenyl type epoxy resins), "YX4000HK" (a bixylenol type epoxy resin), and "YX8800" (an anthracene type epoxy resin) fabricated by Mitsubishi Chemical Corporation; "PG-100" and "CG-500" (fluorene type epoxy resins) fabricated by Osaka gas chemicals Co., Ltd.; "YL7800" (a fluorene type epoxy resin) fabricated by Mitsubishi Chemical Corporation; "jER1010" (a solid bisphenol A type epoxy resin) and "jER1031S" (a tetraphenyl ethane type epoxy resin) fabricated by Mitsubishi Chemical Corporation; and the like.

The epoxy resin composition contains the coated particles of the present invention in an amount of preferably 0.1 to 50% by mass, more preferably 0.3 to 40% by mass, or even more preferably 0.5 to 30% by mass. If the amount of the coated particles contained is 0.1% by mass or more, the thermal curing period can be reduced because the curing can take place quickly. If the amount of the coated particles contained is 50% by mass or less, the resin composition exhibits sufficient acid anhydride resistance and solvent resistance.

The epoxy resin composition of the present invention may further contain at least one selected from the group consisting of curing agents, curing accelerators, thermosetting resins, thermoplastic resins, inorganic fillers, organic fillers, thickeners, defoaming agents, leveling agents, adhesion imparting agents, coloring agents, and organic solvents.

The curing agents mentioned immediately above are curing agents for epoxy resin other than the coated particles of the present invention, and include, for example, acid anhydride compounds, thiol compounds, guanidine compounds, hydrazide compounds, phenol compounds, naphthol compounds, active ester compounds, benzoxazine compounds, cyanate ester compounds, carbodiimide compounds, and the like.

The thiol compounds include: thiol compounds each obtained by an esterification reaction of polyol such as trimethylolpropane tris(thioglycolate), pentaerythritol tetrakis(thioglycolate), ethyleneglycol dithioglycolate, trimethylolpropane tris(3-mercaptopropionate), trimethylolpropane tris(β-thio-propionate), pentaerythritol tetrakis(β(-thio-propionate), or dipentaerythritol poly(β-thio-propionate) with a mercapto organic acid; alkylpolythiol compounds such as 1,4-butanedithiol, 1,6-hexanedithiol, and 1,10-decanedithiol; terminal thiol group-containing polyether; terminal thiol group-containing polythioether; thiol compounds each obtained by a reaction of an epoxy compound and hydrogen sulfide; terminal thiol group-containing thiol compounds each obtained by a reaction of a polythiol compound and an epoxy compound; and the like.

The acid anhydride compounds are tetrahydrophthalic anhydride, hexahydrophthalic anhydride, methyl tetrahydrophthalic anhydride, methylhexahydrophthalic anhydride, methylnadic anhydride, methylbicyclo[2.2.1]heptane-2,3-dicarboxylic anhydride, tetrapropenyl succinic anhydride (3-dodecenyl succinic anhydride), octenyl succinic anhydride, ethylene glycol bis anhydro trimellitate, methyl endomethylene tetrahydrophthalic anhydride, 3,4-dimethyl-6-(2-methyl-1-propenyl)-4-cyclohexene-1, 2-dica rboxylic anhydride, a mixture of any of the foregoing compounds and 1-isopropyl-4-methylbicyclo[2.2.2]oct-5-ene-2,3-dicarboxyli c anhydride, and the like. Examples of the acid anhydrides commercially available are HN-2200 (methyl tetrahydrophthalic anhydride) and HN-5500 (methyl tetrahydrophthalic anhydride) fabricated by Hitachi Chemical Co., Ltd, and the like.

The guanidine compounds are dicyandiamide, 1-methyl guanidine, 1-ethyl guanidine, 1-cyclohexyl guanidine, 1-phenyl guanidine, 1-(o-tolyl) guanidine, dimethyl guanidine, diphenyl guanidine, trimethyl guanidine, tetramethyl guanidine, pentamethyl guanidine, 1,5,7-triazabicyclo[4.4.0]dec-5-ene, 7-methyl-1,5,7-triazabicyclo[4.4.01dec-5-ene, 1-methylbiguanide, 1-ethylbiguanide, 1-n-butylbiguanide, 1-n-octadecylbiguanide, 1,1-dimethylbiguanide, 1,1-diethylbiguanide, 1-cyclohexylbiguanide, 1-allylbiguanide, 1-phenylbiguanide, 1-(o-tolyl)biguanide, and the like. Preferable guanidine compounds are the dicyandiamide, the 1-(o-Tolyl)biguanide, and the like. The dicyandiamide is particularly preferable. As the guanidine compounds commercially available, there are "jER cure DICY-7" (dicyandiamide) fabricated by Japan Epoxy Resin Co., Ltd., "Nocceler BC" (1-(o-tolyl)biguanide) fabricated by Ouchi Shinko Chemical Industrial Co., Ltd., and the like.

The hydrazide compounds are, for example, carbohydrazide, oxalyl dihydrazide, malonic acid dihydrazide, succinic acid dihydrazide, iminodiacetic acid dihydrazide, adipic acid dihydrazide, pimelic acid dihydrazide, suberic acid dihydrazide, azelaic acid dihydrazide, sebacic acid dihydrazide, dodecanedioate hydrazide, hexadecane dihydrazide, maleic acid dihydrazide, fumaric acid dihydrazide, diglycolic acid dihydrazide, tartaric acid dihydrazide, malic acid dihydrazide, isophthalic acid dihydrazide, terephthalic acid dihydrazide, 2,6-naphthoic acid dihydrazide, 4,4'-bis benzene dihydrazide, 1,4-naphthoic acid dihydrazide, naphthalene-2,6-dicarbohydrazide, 3-hydroxy-2-naphthoic acid hydrazide, citric acid trihydrazide, and the like. Then, as commercially available products of the hydrazide compounds, for example, there are AJICURE VDH and AJICURE UDH fabricated by Ajinomoto Fine-Techno Co., Inc., and the like.

Specific examples of the phenol compounds and the naphthol compounds are "MEH-7700", "MEH-7810", and "MEH-7851" fabricatedbyMeiwa Plastic Industries, Ltd., "NHN", "CBN", and "GPH" fabricated by Nippon Kayaku Co., Ltd., "SN170", "SN180", "SN190", "SN475", "SN485", "SN495", "SN375", and "SN395" fabricated by NIPPON STEEL & SUMIKIN CHEMICAL CO., LTD., "LA7052", "LA7054", "LA3018", "EXB-9500", and "TD2090" fabricated by DIC Corporation, and the like.

The active ester compounds are not particularly limited. In general, however, a preferably usable compound is a compound having two or more highly reactive ester groups in one molecule, such as phenol esters, thiophenol esters, N-hydroxyamine esters, and esters of heterocyclic hydroxy compounds. As the active ester compounds, preferred is a compound obtained by a condensation reaction of a carboxylic acid compound and/or a thiocarboxylic acid compound with a hydroxy compound and/or a thiol compound. Specifically, preferable active ester compounds are an active ester compound having a dicyclopentadiene-type diphenol structure, an active ester compound having a naphthalene structure, an active ester compound containing acetylated phenol novolac, and an active ester compound containing benzoylated phenol novolac. The "dicyclopentadiene-type diphenol structure" represents a bivalent structural unit consisting of phenylene-dicyclopentylene-phenylene. Commercial available products of the active ester compounds include, for example, active ester compounds having the naphthalene structure named "EXB9451", "EXB9460", "EXB9460S", and "HPC-8000-65T" (fabricated by DIC Corporation); "EXB9416-70BK" (fabricated by DIC Corporation) as the; an active ester compound containing acetylated phenol novolac named "DC808" (fabricated by Mitsubishi Chemical Corporation); an active ester compound containing benzoylated phenol novolac named "YLH1026" (fabricated by Mitsubishi Chemical Corporation); and the like.

Specific examples of the benzoxazine compounds are "HFB2006M" fabricated by Showa Highpolymer Co., Ltd., and "P-d" and "F-a" fabricated by SHIKOKU CHEMICALS CORPORATION.

As the cyanate ester compounds, there are, for example: bifunctional cyanate resins such as bisphenol A dicyanate, polyphenol cyanate, oligo(3-methylene-1,5-phenylenecyanate), 4,4'-methylenebis(2,6-dimethylphenylcyanate), 4,4'-ethylidenediphenyl dicyanate, hexafluoro bisphenol A dicyanate, 2,2-bis(4-cyanate)phenylpropane, 1,1-bis(4-cyanatephenylmethane), bis(4-cyanate-3,5-dimethylphenyl) methane, 1,3-bis(4-cyanatephenyl-1-(methylethylidene)) benzene, bis(4-cyanatephenyl)thioether, and bis(4-cyanatephenyl)ether; polyfunctional cyanate resins derived from phenol novolac, cresol novolac, and the like; and prepolymers in which these cyanate resins are partially triazinated; and the like. Specific examples of the cyanate ester-based curing agents are "PT30" and "PT60" (both are phenol novolac type polyfunctional cyanate ester resins) fabricated by Lonza Japan Co., Ltd., "BA230" (a prepolymer in which a part or whole of bisphenol A dicyanate is triazinated to be a trimer), and the like.

Examples of the carbodiimide compounds are "V-03" and "V-07" fabricated by Nisshinbo Chemical Inc., and the like.

As the curing accelerators, there are, for example, phosphorus-based curing accelerators, amine-based curing accelerators, imidazole-based curing accelerators, guanidine-based curing accelerators, and the like. The curing accelerators maybe used singly or may be used in a combination of two or more kinds.

As the phosphorus-based curing accelerators, there are, for example, triphenyl phosphine, phosphonium borate compounds, tetraphenylphosphonium tetraphenylborate, n-butylphosphonium tetraphenylborate, tetrabutyl phosphonium decanoate salts, (4-methylphenyl)triphenyl phosphonium thiocyanate, tetraphenylphosphonium thiocyanate, butyl triphenyl phosphonium thiocyanate, and the like. The triphenyl phosphine and the tetrabutyl phosphonium decanoate salts are preferable.

As the amine-based curing accelerators, there are, for example, trialkyl amines such as triethylamine and tributylamine, 4-dimethylaminopyridine, benzyldimethylamine, 2,4,6-tris(dimethylaminomethyl)phenol, 1,8-diazabicyclo(5,4,0)-undecene, and the like. The 4-dimethylaminopyridine and the 1,8-diazabicyclo(5,4,0)-undecene are preferable.

As the imidazole-based curing accelerators, there are, for example, imidazole compounds such as 2-methylimidazole, 2-undecyl imidazole, 2-heptadecyl imidazole, 1,2-dimethyl imidazole, 2-ethyl-4-methylimidazole, 1,2-dimethyl imidazole, 2-ethyl-4-methylimidazole, 2-phenylimidazole, 2-phenyl-4-methylimidazole, 1-benzyl-2-methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, 1-cyanoethyl-2-undecyl imidazolium trimellitate, 1-cyanoethyl-2-phenyl imidazolium trimellitate, 2,4-diamino-6-[2'-methylimidazolyl-(1')]-ethyl-s-triazine, 2,4-diamino-6-[2'-undecylimidazolyl-(1')]-ethyl-s-triazine, 2,4-diamino-6-[2'-ethyl-4'-methylimidazolyl-(1')]-ethyl-s-triazine, 2,4-diamino-6-[2'-methylimidazolyl-(1')]-ethyl-s-triazine isocyanuric acid adduct, 2-phenylimidazole isocyanuric acid adduct, 2-phenyl-4,5-dihydroxymethylimidazole, 2-phenyl-4-methyl-5-hydroxymethylimidazole, 2,3-dihydro-1H-pyrrolo[1,2-a]benzimidazole, 1-dodecyl-2-methyl-3-benzyl-imidazolium chloride, 2-methyl-imidazoline, and 2-phenyl-imidazoline; and adducts of imidazole compounds and epoxy resins. The 2-ethyl-4-methylimidazole and the 1-benzyl-2-phenylimidazole are preferable.

As the imidazole-based curing accelerators, a commercially available accelerator maybe used, and " P200-H50" fabricated by Mitsubishi Chemical Corporation, for example, and so on may be used.

As the guanidine-based curing accelerators, it is possible to use the same compounds as the guanidine compounds usable as the foregoing curing agent. For example, dicyandiamide, 1-methyl guanidine, 1-ethyl guanidine, 1-cyclohexyl guanidine, 1-phenyl guanidine, 1-(o-tolyl)guanidine, dimethyl guanidine, diphenyl guanidine, trimethyl guanidine, tetramethyl guanidine, pentamethyl guanidine, 1,5,7-triazabicyclo[4.4.0]dec-5-ene, 7-methyl-1,5,7-triazabicyclo[4.4.0]dec-5-ene, 1-methylbiguanide, 1-ethylbiguanide, 1-n-butylbiguanide, 1-n-octadecylbiguanide, 1,1-dimethylbiguanide, 1,1-diethylbiguanide, 1-cyclohexylbiguanide, 1-allylbiguanide, 1-phenylbiguanide, 1-(o-tolyl)biguanide, and the like. The dicyandiamide and the 1,5,7-triazabicyclo[4.4.0]dec-5-ene are preferable.

A content of the curing accelerator in the resin composition is not particularly limited, but it is preferable to use the curing accelerator in a range of 0.05% by mass to 3% by mass.

The thermosetting resins are thermosetting resins other than the foregoing epoxy resins, and the usable thermosetting resins are, for example, vinylbenzyl compounds, acrylic compounds, maleimide compounds, blocked isocyanate compounds, and the like.

Examples of the thermoplastic resins include phenoxy resins, polyvinyl acetal resins, polyolefin resins, polybutadiene resins, polyimide resins, polyamideimide resins, polyetherimide resins, polysulfone resins, polyether sulfone resins, polyphenylene ether resins, polycarbonate resins, polyether ether ketone resins, and polyester resins. The phenoxy resins are preferable. The thermoplastic resins may be used singly, or may be used in a combination of two or more kinds.

The average molecular mass of the thermoplastic resin in terms of polystyrene is preferably in a range of 8, 000 to 70, 000, more preferably in a range of 10,000 to 60,000, or even more preferably in a range of 20,000 to 60,000. The average molecular mass of the thermoplastic resin in terms of polystyrene is measured by a gel permeation chromatography (GPC) method. Specifically, in the GPC method, a measurement is conducted at a column temperature 40° C. using LC-9A/RID-6A manufactured by Shimadzu Corporation as a measurement device, using Shodex K-800P/K-804L/K-804L manufactured by Showa Denko K.K. as a column, and using chloroform or the like as a mobile phase, and the average molecular mass of the thermoplastic resin in terms of polystyrene is calculated from a calibration curve of standard polystyrene obtained by the measurement.

Examples of the phenoxy resins are phenoxy resins each having one or more skeletons selected from the group consisting of a bisphenol A skeleton, a bisphenol F skeleton, a bisphenol S skeleton, a bisphenol acetophenone skeleton, a novolac skeleton, a biphenyl skeleton, a fluorene skeleton, a dicyclopentadienyl skeleton, a norbornene skeleton, a naphthalene skeleton, an anthracene skeleton, an adamantane skeleton, a terpene skeleton, and a trimethyl cyclohexane skeleton, for example, The terminal of the phenoxy resin may be any functional group among phenolic hydroxyl groups, epoxy groups, and the like. The phenoxy resins may be used singly or maybe used in a combination of two or more kinds. Specific examples of the phenoxy resins include "1256" and "4250" (both are bisphenol A skeleton-containing phenoxy resins), "YX8100" (bisphenol S skeleton-containing phenoxy resin), and "YX6954" (bisphenol acetophenone skeleton-containing phenoxy resin) fabricated by Mitsubishi Chemical Corporation, and further include "FX280" and "FX293" fabricated by NIPPON STEEL & SUMIKIN CHEMICAL CO., LTD.; "YL6954BH30", "YX7553", "YL7769BH30" "YL6794", "YL7213", "YL7290", and "YL7482" fabricated by Mitsubishi Chemical Corporation; and the like.

The polyvinyl acetal resins are, for example, polyvinyl formal resins and polyvinyl butyral resins. The polyvinyl butyral resins are preferable. Specific examples of the polyvinyl acetal resins are "Denka butyral 4000-2", "Denka butyral 5000-A", "Denka butyral 6000-C", and "Denka butyral 6000-EP" fabricated by Denki Kagaku Kogyo Co., Ltd.; S-LEC BH series, BX series, KS series, BL series, and BM series fabricated by Sekisui Chemical Co., Ltd; and the like.

Specific examples of the polyimide resins include "RIKA-COAT SN20" and "RIKACOAT PN20" fabricated by New Japan Chemical Co., Ltd.

Specific examples of the polyamide-imide resins include "VYLOMAX HR11NN" and "VYLOMAXHR16NN" fabricated by Toyobo Co., Ltd. In addition, specific examples of the polyamide-imide resins also include modified polyamide-imide such as "KS9100" and "K59300" (polysiloxane skeleton-containing polyamide-imide) fabricated by Hitachi Chemical Co., Ltd.

Specific examples of the polyether sulfone resins are "PES5003P," fabricated by Sumitomo Chemical Co., Ltd., and the like.

Specific examples of the polysulfones resin are "P1700" and "P3500" fabricated by Solvay Advanced Polymers k.k., and the like.

A content of the thermoplastic resin in the resin composition is preferably 0.1% by mass to 20% by mass, more preferably 0.5% by mass to 10% by mass, or even more preferably 1% by mass to 5% by mass.

Materials for the inorganic fillers are not particularly limited, but may be, for example, silica, alumina, glass, cordierite, silicon oxide, barium sulfate, barium carbonate, talc, clay, mica powder, zinc oxide, hydrotalcite, boehmite, aluminum hydroxide, magnesium hydroxide, calcium carbonate, magnesium carbonate, magnesium oxide, boron nitride, aluminum nitride, manganese nitride, aluminum borate, strontium carbonate, strontium titanate, calcium titanate, magnesium titanate, bismuth titanate, titanium oxide, zirconium oxide, barium titanate, barium zirconate titanate, barium zirconate, calcium zirconate, zirconium phosphate, phosphoric acid zirconium tungstate, iron, iron oxide, ferrite, alloys, other electrically conductive fillers, magnetic fillers, thermally conductive fillers, and the like. As an embodiment of the present invention, an epoxy resin composition containing one or more fillers selected from the group consisting of silica, electrically conductive fillers, magnetic fillers, and thermally conductive fillers is preferable.

Specifically, the silica is amorphous silica, fused silica, crystalline silica, synthetic silica, hollow silica, and the like. Furthermore, the preferable silica is spherical silica. The average particle diameter is not particularly limited, but is preferably 600 nm or less, more preferably 300 nm or less, or even more preferably 200 nm or less. The lower limit of the average particle diameter is not particularly limited, but is preferably 5 nm or more. As commercially available silica, there are, for example, "SO-C2", "SO-C1", and "SO-C4" fabricated by Admatechs Company Limited, and the like. The average particle diameter of the inorganic filler can be measured by a laser diffraction scattering method based on the Mie scattering theory.

As the electrically conductive materials, specifically, there are solder particles, nickel particles, nano-size metal crystals, metal particles with surfaces coated with another metal, metal particles such as graded particles of copper and silver, and are, for example, particles in which resin particles of any of styrene resins, urethane resins, melamine resins, epoxy resins, acrylic resins, phenol resins, styrene-butadiene resins, and so on are coated with conductive thin films of gold, nickel, silver, copper, solder, or the like. The electrically conductive fillers are usually spherical microparticles of approximately 1 to 20 μm.

As the magnetic fillers, specifically, there are pure iron powder, Fe alloys such as, Fe—Si-based alloy powder, Fe—Si—Al-based alloy powder, Fe—Ni-based alloy powder, Fe—Ni—Mo-based alloy powder, Fe—Ni—Mo—Cu-based alloy powder, Fe—Co-based alloy powder, Fe—Ni—Co-based alloy powder, Fe—Cr-based alloy powder, Fe—Cr—Si-based alloy powder, Fe—Ni—Cr-based alloy powder or Fe—Cr—Al-based alloy powder; amorphous alloys such as Fe-based amorphous alloys and Co-based amorphous alloys; spinel-type ferrites such as Mg—Zn-based ferrite, Mn—Zn-based ferrite, Mn—Mg-based ferrite, Cu—Zn-based ferrite, Mg—Mn—Sr-based ferrite, and Ni—Zn-based ferrite; hexagonal ferrites such as Ba—Zn-based ferrite, Ba—Mg-based ferrite, Ba—Ni-based ferrite, Ba—Co-based ferrite, and Ba—Ni—Co-based ferrite; and garnet-type ferrites such as Y ferrite.

As the thermally conductive materials, specifically, there are fillers made of aluminum nitride, alumina, boron nitride, silicon nitride, graphite powder, and silicon carbide. An example of commercially available aluminum nitride is "Shapal H" fabricated by Tokuyama Corporation, and an example of commercially available silicon nitride is "the SN-9S" fabricated by Denki Kagaku Kogyo Co., Ltd. Examples of commercially available alumina are "AHP300" fabricated by Nippon Light Metal Co., Ltd., "ALUNA-BEADS (registered trademark) CB" (for example, "CB-P05" and "CB-A30S") fabricated by Showa Denko K.K., "DAW-45", "DAW-05", and "ASFP-20" fabricated by Denka Company Limited, and the like.

As the organic fillers, there are silicon powder, nylon powder, fluorine powder, acrylic rubber particles, fine polyamide particles, silicone particles, and the like. Specific examples of the acrylic rubber particles may be any fine particles as long as the fine particles are made of a resin that exhibits rubber elasticity such as acrylonitrile-butadiene rubber, butadiene rubber, or acrylic rubber, and is made insoluble and infusible in an organic solvent by chemical crosslinking treatment. Specific examples of the organic fillers are XER-91 (fabricated by JSR Corporation), Staphyloid AC3355, AC3816, AC3832, AC4030, AC3364, and IM101 (all fabricated by Aica Kogyo Co., Ltd.), Paraloid EXL2655 and EXL2602 (both fabricated by Kureha Chemical Kogyo Co., Ltd.), and the like. Specific examples of the fine polyamide particles maybe fine particles having a size of 50 microns or smaller and made of any of resins containing an amide bond, such as aliphatic polyamide like nylon, aromatic polyamide like Kevlar, and polyamide-imide. Specific examples are VESTOSINT 2070 (fabricated by Daicel Huls Co. Ltd.), SP500 (fabricated by Toray Industries, Inc.), and the like.

As the thickeners, there are Orben, Benton, and the like.

As the defoaming agents, there are, for example, a silicone-based defoaming agent, a fluorine-based defoaming agents, polymeric defoaming agents, and the like.

As the leveling agents, commercially available surfactants can be used, such for example as silicone-based, fluoric, ester-based, cationic, anionic, nonionic, and amphoteric surfactants. Such surfactants may be used singly or may be used in a combination of two or more kinds. The foregoing surfactants are, for example, polyoxyethylene alkyl ethers, polyoxyethylene alkyl phenyl ethers, polyethylene glycol diesters, sorbitan fatty acid esters, fatty acid modified polyesters, tertiary amine-modified polyurethanes, polyethylene imines, and so on. To be more specific, trade product names of the surfactants are KP (fabricated by Shin-Etsu chemical Co., Ltd.), Polyflow (fabricated by Kyoeisha Chemical Co., Ltd.), EFTOP (fabricated by Mitsubishi Materials Electronic Chemicals Co., Ltd.), MEGAFACE (fabricated by DIC Corporation), Fluorad (fabricated by Sumitomo 3M Limited), Asahi Guard (fabricated by Asahi Glass Co., Ltd.), Surflon (fabricated by AGC Seimi Chemical Co., Ltd.), Solsperse (fabricated by Zeneca, Inc.), EFKA (fabricated by CIBA AG), AJISPER (fabricated by Ajinomoto Fine Techno Co., Inc.), and the like.

As the adhesion-imparting agents, there are, for example, imidazole-based, thiazole-based, and triazole-based silane coupling agent, and the like. Specifically, there are vinyltrimethoxysilane, vinyltriethoxysilane, vinyl tris(2-methoxyethoxy)silane, N-(2-aminoethyl)-3-aminopropylmethyldimethoxysilane, N-(2-aminoethyl)-3-aminopropyltrimethoxysilane, 3-aminopropyltriethoxysilane, 3-glycidoxypropyltrimethoxysilane, 3-glycidoxypropylmethyldimethoxysilane, 2-(3,4-epoxycyclohexyl)ethyltrimethoxysilane, 3-chloropropylmethyldimethoxysilane, 3-chloro-propyl trimethoxysilane, 3-methacryloyloxy propyl trimethoxysilane, 3-mercaptopropyl trimethoxysilane, and the like.

As the coloring agents, there are, for example, phthalocyanine blue, phthalocyanine green, iodine green, disazo yellow, carbon black, and the like.

As the organic solvents, there are ketones such as acetone, methyl ethyl ketone (MEK) and cyclohexanone; acetic acid esters such as ethyl acetate, butyl acetate, cellosolve acetate, propylene glycol monomethyl ether acetate, and carbitol acetate; carbitols such as cellosolve and butyl carbitol; aromatic hydrocarbons such as toluene and xylene; amide-based solvents such as dimethylformamide, dimethylacetamide (DMAc) and N-methylpyrrolidone; and the like. The organic solvents may be used singly, or may be used in a combination of two or more kinds.

The epoxy resin of the present invention may be any of liquid, paste, and film resins.

The epoxy resin compositions can be used as epoxy resin materials and the like in the fields such, for example, as constructions, civil engineering, automobiles, vessels, aerospace industries, industrial machinery, robots, communications, electrical and electronics industries, semiconductors, and displays.

More specifically, the epoxy resin compositions can be used as adhesive agents, bonding agents, electrically conductive materials, magnetic materials, thermally conductive materials, insulating materials, encapsulation materials, coating materials, paints, and the like.

Regarding the adhesive agents and the bonding agents, the epoxy resin compositions are useful as adhesives and sealing materials for constructions and civil engineering, structural adhesive and bonding agents for automobiles, vessels, and aircrafts, adhesives for assembling industrial machineries and robots, die bonding materials for assembling electronic parts and IC chips, and the like. The adhesive agents and the bonding agents of the present invention maybe used for housings, bodies, and chassis of automobiles, vessels, and aircrafts, for CPUs of PCs, smartphones, and tablets, and for spindle motor parts for camera modules, communication modules, and hard disks, and so on.

As the electrically conductive materials, the epoxy resin compositions preferably contain the aforementioned electrically conductive fillers. As a manufacturing method thereof, there has been proposed a method in Japanese Patent Application Publication No. H01-113480, for example.

The electrically conductive materials of the present invention can be used: to manufacture electronic equipment, integrated circuits, semiconductor elements, passive elements, solar cells, solar modules, and/or light emitting diodes; to mount chip components of driver ICs, LED elements, and so on; to assemble electronic parts; and to do the like. With both conductive and insulating properties imparted, the epoxy resin compositions can also be anisotropic conductive materials.

As the magnetic materials, the epoxy resin compositions preferably contain the magnetic fillers described above. The magnetic materials of the present invention can be used for electromagnetic wave shields, coil components, inductor elements, electromagnetic wave absorbers, magnetic inks, antenna devices, and so on.

As the thermally conductive materials, the epoxy resin compositions preferably contain the thermally conductive fillers described above. The thermally conductive materials of the present invention can be used for CPUs, power IC modules, and so on. As a method for producing a thermally conductive material, there are methods disclosed in, for example, Japanese Patent Application Publication Nos. H06-136244, H10-237410, and 2000-3987, and others. More specifically, an epoxy resin as a thermosetting resin, a phenol novolac curing agent or a thiol compound as a curing agent, and further a thermally conductive filler material are blended together, and are uniformly kneaded. Then, the coated particles of the present embodiment are blended to the mixture to obtain a thermally conductive material.

For the insulating materials, it is preferable to use the insulating fillers, for example, the silica among the fillers mentioned above. As a method for producing an insulating film, there have been proposed methods in, for example, Japanese Patent Application Publication Nos. S62-141083 and H05-295329, and others. More specifically, a solution is prepared in which a solid epoxy resin, a liquid epoxy resin, and further a solid urethane resin if necessary are dissolved, mixed, or dispersed in toluene in a total amount of 50% by mass relative to a total mass of all the ingredients including the solvent. Then, the obtained solution is added with the coated particles of the present embodiment in an amount of 30% by mass relative to the solution to prepare a varnish in which the coated particles are dispersed. Subsequently, a coating of this varnish is applied to, for example, a polyethylene terephthalate release substrate with a thickness of 50 μm such that the coating will have a thickness of 30 μm after the toluene is dried. After the toluene is dried, this coating becomes capable of being kept inactive at a normal temperature, but exhibiting adhesiveness by means of an action of the latent curing agent when heated.

The insulating materials of the present invention may be usable as insulating adhesive sheets, insulating adhesive films, insulating adhesive pastes, insulating pastes, insulating films, insulating sheets, insulating paints for electrical and electronic parts, and so on. The insulating materials of the present invention can be effectively used in insulation-requiring applications, and thus can be used for interlayer insulating layers or solder resist layers in printed wiring boards, and the like.

As the encapsulation materials, there are solid encapsulation materials, liquid encapsulation materials, film-form encapsulation materials, and the like. The liquid encapsulation materials are useful as an underfill material, a potting material, a dam material, a casting material, and so on. The encapsulation materials of the present invention can be used in semiconductor packages such as wafer level packages and ball grid array (BGA) packages, and others. As a method for producing an encapsulation material, it is possible to use methods described in, for example, Japanese Patent Application Publication Nos. H05-43661 and 2002-226675, and others. According to these methods, the encapsulation material can be produced as molding materials for encapsulation and impregnation of electrical and electronic parts. More specifically, a bisphenol F type epoxy resin, an aliphatic epoxy resin, an acid anhydride curing agent such as a curing agent made of methylhexahydrophthalic anhydride, and spherical fused silica powder are added together and uniformly mixed, thereafter the coated particles of the present embodiment are further added, and the resultant mixture is further mixed uniformly, so that a encapsulation material can be obtained.

As the coating materials, there are, for example, an overcoating material for a flexible printed circuit board, an interlayer insulating coating material for a printed circuit board, an electromagnetic wave absorbing material, and so on. The coating materials of the present invention can be used for flexible printed circuit boards, multilayer printed circuit boards, and the like. As a method for producing a coating material, there have been proposed methods in, for example, Japanese Examined Patent Application Publication No. H04-6116, Japanese Patent Application Publication Nos. H07-304931, H08-64960, and 2003-246838, and others. More specifically, the silica or the like is selected as a filler from the foregoing fillers, is blended with a bisphenol A type epoxy resin, a phenoxy resin, a rubber-modified epoxy resin, and the like, and then is further blended with the coated particles of the present embodiment. Then, a solution in which the above mixture is contained in an amount of 50% by mass is prepared by using methyl ethyl ketone (MEK). A coating of this solution in a thickness of 50 μm is applied to a polyimide film, and is laminated with a copper foil at 60° C. to 150° C., followed by heating and curing at 180° C. to 200° C. Thus, the laminate in which the coating of the epoxy resin composition is applied between the layers can be obtained.

As the paints, there are powder paints and so on. The paints of the present invention are usable for anticorrosion applications, paint applications to inner and outer surfaces of pipes, home appliances, electrical and electronic parts, automobile parts, and the like.

As a method for producing a paint, there have been proposed methods in, for example, Japanese Patent Application Publication Nos. H11-323247 and 2005-113103, and others. More specifically, a bisphenol A type epoxy resin is blended with titanium dioxide, talc, or the like, and is added with a mixture solvent of methyl isobutyl ketone (MIBK)/xylene of 1:1 (mass ratio), followed by stirring and mixing to obtain a base agent. The coated particles of the present embodiment are added to and are uniformly dispersed in the base agent, thereby obtaining a paint.

As another embodiment of the present invention, it is possible to provide a sheet material containing an epoxy resin composition of the present invention. The sheet material of the present invention includes a support, and a resin composition layer containing a resin composition of the present invention and provided on the support. The support is a film made of a plastic material, a metal foil, or release paper, for example.

In the case where a film made of a plastic material is used as the support, the plastic material is, for example, polyester such as polyethylene terephthalate (abbreviated as "PET") or polyethylene naphthalate (abbreviated as "PEN"), polycarbonate (abbreviated as "PC"), acryl such as polymethyl methacrylate (PMMA), cyclic polyolefin, triacetyl cellulose (TAC), polyether sulfide (PES), polyether ketone, polyimide, or the like.

In the case where a metal foil is used as the support, the metal foil is, for example, a copper foil, an aluminum foil, or the like, and the copper foil is preferable. As the copper foil, a foil made of pure copper, in other words, a single metal may be used, or a foil made of an alloy of copper and another metal (for example, tin, chromium, silver, magnesium, nickel, zirconium, silicon, titanium, or the like) may also be used.

Further, as the support, it is possible to use a release layer-equipped support including a release layer on a surface to be bonded with a resin composition layer.

The sheet material of the present invention can be produced by, for example, preparing a resin varnish in which a resin composition is dissolved in an organic solvent, then applying this resin varnish onto a support by using a die coater, and subsequently drying the applied varnish to form a resin composition layer. The drying may be carried out by a publicly-known method such as heating or hot air blowing.

In the sheet material, the surface of the resin composition layer not in contact with the support (in other words, the surface on the opposite side from the support) may be further laminated with a protective film serving as a quasi-support.

As still another embodiment of the present invention, it is possible to provide composite materials containing the epoxy resin compositions of the present invention. The composite materials are, for example, a composite material usable in a resin transfer molding method, a composite material usable in a filament winding method, a prepreg, and so on.

A fibrous base material usable to form the prepreg is not particularly limited, but may be any material conventionally used as a prepreg base material such as glass cloth, carbon fiber, aramid nonwoven fabric, or liquid crystal polymer non-woven fabric.

The prepreg can be produced by a known method such as a hot melt method and a solvent method.

As production examples of the resins for the composite materials, there have been proposed methods in, for example, Japanese Patent Application Publication Nos. 2009-102563, 2010-100730, and 2013-18804, and others. More specifically, a bisphenol A type epoxy resin and an acid anhydride curing agent such as a curing agent made of methyl nadic anhydride, methyl tetrahydrophthalic anhydride, or the like are added together and uniformly mixed. Then, the above mixture is further added with the coated particles of the present invention, and is uniformly mixed to obtain a resin for composite materials.

The coated particles of the present invention are less likely to aggregate, and are excellent in the acid anhydride resistance and the solvent resistance.

The aggregation of coated particles can be evaluated by measuring the average particle diameter of the coated particles. To be more precise, when the coated particles aggregate, the average particle diameter obtained is larger than the average particle diameter of each coated particle. This is because the particle diameter of each of the coated particles contained in the aggregate is not measured, but the particle diameter of the entire aggregate is measured. The phrase "less likely to aggregate" means that particles do not aggregate very much under a coating treatment, and means that there is only a small difference in the measured value of the average particle diameter between uncoated curing agent particles for epoxy resin and the coated curing agent particles for epoxy resin. The average particle diameter D of the coated particles of the present invention is preferably 1.0 to 5.0 times, more preferably greater than 1.0 to 4.0 times, or even more preferably 1.1 to 3.0 times the average particle size of the (A) curing agent particles for epoxy resin before the coating treatment. Instead, the average particle diameter D of the coated particles of the present invention is more preferably 1.0 to 4.0 times, or much more preferably 1.0 to 3.0 times the average particle size of the (A) curing agent particles for epoxy resin before the coating treatment.

The acid anhydride resistance of the coated particles can be evaluated by, for example, storing an epoxy resin composition containing the coated particles and an acid anhydride under predetermined conditions, and by measuring a viscosity increase rate of the viscosity of the composition after the storage from the viscosity of the composition prior to the storage. The viscosity can be measured by a commercially available viscosity measuring device, for example, an RE80 viscometer (Cone Rotor: 1.34°×R24 manufactured by Toki Sangyo Co., Ltd.). The lower the viscosity increase rate, the better the acid anhydride resistance.

The solvent resistance of the coated particles can be evaluated by, for example, storing an epoxy resin composition containing the coated particles and an acid anhydride under predetermined conditions, and by measuring a viscosity increase rate of the viscosity of the composition after the storage from the viscosity of the composition prior to the storage. The viscosity can be measured by a commercially available viscosity measuring device, for example, an RE80 viscometer (Cone Rotor: 1.34°×R24 manufactured by Toki Sangyo Co., Ltd.). The lower the viscosity increase rate, the better the solvent resistance.

EXAMPLES

Hereinafter, the present invention is described in more details based on examples and comparative examples, but the present invention is not limited to the following examples.

Production Example 1

In a Henschel mixer (FM10C/I manufactured by NIPPON COKE & ENGINEERING CO., LTD.) in which a wall surface temperature was controlled at 40° C., preparatory mixing of 1,000 g of an imidazole-adduct latent curing agent (AJICURE PN-50J fabricated by Ajinomoto Fine Techno Co., Inc.; the average particle diameter: 2.5 µm; the density: 1.2 g/cm$^3$; the specific surface area: 2.0 m'/g; and d90/d50=1.9) was conducted for 2 minutes, and thereafter 200 g of a glycidoxyalkyl alkyl group-containing alkoxy oligomer (a glycidoxypropyl group-containing methoxy/ethoxysilyl resin; a content of SiO$_2$: 39% by mass; X-41-1053 fabricated by Shin-Etsu Chemical Co., Ltd.; the viscosity (25° C.): 12 mm/s; and the average molecular mass: 3863) was added dropwise over a period of 3 minutes to the curing agent being mixed. Then, the resultant curing agent was fully mixed for 5 minutes to obtain coated particles A.

Production Example 2

Coated particles B were obtained in the same way as in Production Example 1 except that the amount of the glycidoxyalkyl alkyl group-containing alkoxy oligomer (X-41-1053 fabricated by Shin-Etsu Chemical Co., Ltd.) was changed from 200 g to 50 g.

Production Example 3

Coated particles C were obtained in the same way as in Production Example 1 except that the amount of the glycidoxyalkyl alkyl group-containing alkoxy oligomer (X-41-1053 fabricated by Shin-Etsu Chemical Co., Ltd.) was changed from 200 g to 10 g.

Production Example 4

Coated particles D were obtained in the same way as in Production Example 1 except that the amount of the glycidoxyalkyl alkyl group-containing alkoxy oligomer (X-41-1053 fabricated by Shin-Etsu Chemical Co., Ltd.) was changed from 200 g to 5 g.

Production Example 5

Coated particles E were obtained in the same way as in Production Example 1 except that 200 g of the glycidoxyalkyl alkyl group-containing alkoxy oligomer (X-41-1053 fabricated by Shin-Etsu Chemical Co., Ltd.) was changed to 50 g of a mercaptoalkyl group-containing alkoxy oligomer (a mercaptopropyl group-containing methoxy/ethoxysilyl resin, a content of SiO$_2$: 43% by mass; X-41-1805 fabricated by Shin-Etsu Chemical Co., Ltd.; the viscosity(25° C.): 30 mm$^2$/s; and the average molecular mass: 7059).

Production Example 6

Coated particles F were obtained in the same way as in Production Example 1 except that 200 g of the glycidoxyalkyl alkyl group-containing alkoxy oligomer (X-41-1053 fabricated by Shin-Etsu Chemical Co., Ltd.) was changed to 50 g of an aminoalkyl group-containing alkoxy oligomer (a 3-aminopropyl group-containing methoxysilyl resin; a content of SiO$_2$: 75% by mass; X-40-2651 fabricated by Shin-Etsu Chemical Co., Ltd.; the viscosity(25° C.): 20 mm$^2$/s; and the average molecular mass: 3917).

Production Example 7 (Comparative Example)

Coated particles G were obtained in the same way as in Production Example 1 except that 200 g of the glycidoxyalkyl alkyl group-containing alkoxy oligomer (X-41-1053 fabricated by Shin-Etsu Chemical Co., Ltd.) was changed to 50 g of a glycidoxyalkyl group-containing silane coupling agent (KBM-403 fabricated by Shin-Etsu Chemical Co., Ltd.; and the viscosity (25° C.): 3 mm$^2$/s).

Production Example 8

Coated particles H were obtained in the same way as in Production Example 2 except that the imidazole-adduct latent curing agent (PN-50J fabricated by Ajinomoto Fine Techno Co., Inc.) was changed to 50 g of a tertiary amine-adduct latent curing agent (MY-24J fabricated by Ajinomoto Fine Techno Co., Inc.; the average particle diameter: 2.5 µm; the density: 1.2 g/cm$^3$; the specific surface area: 2.0 m$^2$/g; and d90/d50=1.9).

Production Example 9

Coated particles I were obtained in the same way as in Production Example 2 except that the imidazole-adduct latent curing agent (PN-50J fabricated by Ajinomoto Fine Techno Co., Inc.) was changed to a tertiary amine-adduct latent curing agent (FXR1081 fabricated by T&K TOKA Corporation; the average particle diameter: 4.0 µm; the density: 1.1 g/cm$^3$; the specific surface area: 1.4 m$^2$/g; and d90/d50–1.9).

Measurement of Particle Size

The average particle diameters of the particles were measured by using a laser diffraction particle size distribution analyzer (SALD-2200 manufactured by Shimadzu Corporation). A polyoxyethylene (20) sorbitan monolaurate solution was used as a dispersion medium solution. The results are presented in Table 1.

Measurement of Amount of Alkoxy Oligomer

The coated particles were thoroughly washed with hexane and thereafter were dried under reduced pressure to obtain the washed coated particles. 500 mg of the washed coated particles were heated at 660° C. for 2 hours in an electric furnace. The mass of the alkoxy oligomer present in the washed coated particles was obtained by dividing the mass of $SiO_2$ obtained as ash by the content of $SiO_2$ in the alkoxy oligomer, and then the amount of the alkoxy oligomer (% by mass) was calculated relative to 100% by mass of uncoated curing agent particles for epoxy resin.

Calculation of Amount of Alkoxy Oligomer per Unit Surface Area

The mass of the alkoxy oligomer present in the washed coated particles was obtained in the same way as the above. Then, the amount of the alkoxy oligomer in the coated particles per unit surface area of curing agent particles for epoxy resin was calculated by dividing the obtained mass of the alkoxy oligomer by a total surface area of the uncoated curing agent particles for epoxy resin ((the mass of the curing agent particles) x (the specific surface area of the curing agent particles)).

$SiO_2$ Content in Coated Particles (% by mass)

The $SiO_2$ content (% by mass) relative to 100% by mass of the coated particles was calculated from the mass of $SiO_2$ obtained as the ash in the same way as the above.

<Evaluation>

Acid Anhydride Resistance (Measurement of Viscosity Increase Rate)

3 parts by mass of the coated particles A to F, H, or I (each of Examples 1 to 8), the coated particles G (Comparative Example 1), an uncoated imidazole-adduct latent curing agent (PN-50J fabricated by Ajinomoto Fine Techno Co., Inc. (Comparative Example 2)), or an uncoated tertiary amine-adduct latent curing agent (MY-24J fabricated by Ajinomoto Fine Techno Co., Inc. (Comparative Example 3) or FXR1081 fabricated by T&K TOKA Corporation (Comparative Example 4)) was added to 100 parts by mass of an epoxy resin (jER828EL, fabricated by Mitsubishi Chemical Corporation, the epoxy equivalent: 190) and 80 parts by mass of an acid anhydride curing agent (HN-2200, fabricated by Hitachi Chemical Co., Ltd.), followed by stirring with a planetary centrifugal mixer ("THINKY MIXER ARV-310" fabricated by THINKY CORPORATION) to obtain a resin composition. Then, 0.15 parts by mass of a glycidoxyalkyl alkyl group-containing alkoxy oligomer (X-41-1053 fabricated by Shin-Etsu Chemical Co., Ltd.) was added to the resin composition of Comparative Example 2 (Comparative Example 5), followed by stirring with the planetary centrifugal mixer ("THINKY MIXER ARV-310" fabricated by THINKY CORPORATION) to obtain a resin composition. After the obtained resin compositions were allowed to stand at 40° C. for 3 days, the viscosities of the resins were measured and the viscosity increase rates were calculated in accordance with the equation presented below.

The viscosities were measured by using the RE80 viscometer (Cone Rotor: 1.34°×R24 manufactured by Toki Sangyo Co., Ltd.). The viscosity was defined as a value obtained by measurement on 1.0 to 1.5 ml of a measurement target resin composition after rotation for 120 seconds at a rotor rotation speed of 20 rpm (unit: Pa·s).

((Viscosity after 3 days at 40° C.)/(Initial Viscosity immediately after Stirring) −1)×100=Viscosity Increase Rate [%]

The lower the viscosity increase rate, the better the acid anhydride resistance.

The Evaluation was Made Based on the Following Scores:
30% or less is scored as excellent (represented by ⊚);
more than 30% but not more than 40% is scored as good (represented by ○):
more than 40% but not more than 50% is scored as fair (represented by Δ); and
more than 50% is scored as poor (represented by ×). The results are presented in Table 1.

Solvent Resistance (Measurement of Viscosity Increase Rate)

20 parts by mass of the coated particles A to F, H, or I (each of Examples 1 to 8), the coated particles G (Comparative Example 1), the uncoated imidazole-adduct latent curing agent (PN-50J fabricated by Ajinomoto Fine Techno Co., Inc. (Comparative Example 2)), or the uncoated tertiary amine-adduct latent curing agent (MY-24J fabricated by Ajinomoto Fine Techno Co., Inc. (Comparative Example 3) or FXR1081 fabricated by T&K TOKA Corporation (Comparative Example 4)) was added to 100 parts by mass of an epoxy resin (jER828EL, fabricated by Mitsubishi Chemical Corporation) and 10 parts by mass of a solvent (methyl ethyl ketone), followed by stirring with the planetary centrifugal mixer ("THINKY MIXER ARV-310" fabricated by THINKY CORPORATION) to obtain a resin composition. In addition, 1 part by mass of a glycidoxyalkyl alkyl group-containing alkoxy oligomer (X-41-1053 fabricated by Shin-Etsu Chemical Co., Ltd.) was added to the resin composition of Comparative Example 2 (Comparative Example 5), followed by stirring with the planetary centrifugal mixer ("THINKY MIXER ARV-310" fabricated by THINKY CORPORATION) to obtain a resin composition. After the obtained resin compositions were allowed to stand at 25° C. for 1 week, the viscosities of the resins were measured and the viscosity increase rates were calculated in accordance with the equation presented below.

The viscosities were measured by using the RE80 viscometer (Cone Rotor: 1.34°×R24 manufactured by Toki Sangyo Co., Ltd.). The viscosity was defined as a value obtained by measurement on 1.0 to 1.5 ml of a measurement target resin composition after rotation for 120 seconds at a rotor rotation speed of 20 rpm (unit: Pa·s).

((Viscosity after 1 week at 25° C.)/(Initial Viscosity immediately after Stirring) −1)×100=Viscosity Increase Rate [%]

The lower the viscosity increase rate, the better the solvent resistance.

The evaluation was made based on the following scores:
25% or less is scored as excellent (represented by ⊚);
more than 25% but not more than 50% is scored as good (represented by ○);
more than 50% but not more than 100% is scored as fair (represented by Δ); and
more than 100% is scored as poor (represented by ×).
The results are presented in Table 1.

TABLE 1

| | | Average Particle Diameter | Average Particle Diameter Ratio of Coated Particles to (A) Curing Agent Particles for Epoxy Resin (times) | Mass of (B) Alkoxy Oligomer relative to Mass of (A) Curing Agent Particles for Epoxy Resin (% by mass) |
|---|---|---|---|---|
| Example 1 | Coated Particles A | 7 μm | 2.8 | 20% |
| Example 2 | Coated Particles B | 4.5 μm | 1.8 | 5% |

TABLE 1-continued

| | | | | |
|---|---|---|---|---|
| Example 3 | Coated Particles C | 3.0 μm | 1.2 | 1% |
| Example 4 | Coated Particles D | 3.0 μm | 1.2 | 0.5% |
| Example 5 | Coated Particles E | 4.5 μm | 1.8 | 5% |
| Example 6 | Coated Particles F | 5.0 μm | 2.0 | 5% |
| Example 7 | Coated Particles H | 5.0 μm | 2.0 | 5% |
| Example 8 | Coated Particles I | 8.0 μm | 2.0 | 5% |
| Comparative Example 1 | Coated Particles G | 13 μm | 5.2 | — |
| Comparative Example 2 | PN-50J | 2.5 μm | — | — |
| Comparative Example 3 | MY-24J | 2.5 μm | — | — |
| Comparative Example 4 | FXR-1081 | 4.0 μm | — | — |
| Comparative Example 5 | PN-50J + X-41-1053 | 2.5 μm | — | 5% |

| | Alkoxy Oligomer Amount per Unit Surface Area (mg/m$^2$) | SiO$_2$ Content in Coated Particles (% by mass) | Acid Anhydride Resistance (Viscosity Increase Rate %) | Solvent Resistance (Viscosity Increase Rate %) |
|---|---|---|---|---|
| Example 1 | 103.0 | 6.5% | ◎ | ◎ |
| Example 2 | 28.0 | 1.9% | ◎ | ◎ |
| Example 3 | 5.0 | 0.4% | ○ | △ |
| Example 4 | 3.0 | 0.2% | △ | △ |
| Example 5 | 23.0 | 2.0% | ○ | ◎ |
| Example 6 | 24.0 | 3.5% | △ | △ |
| Example 7 | 25.0 | 1.9% | ◎ | ○ |
| Example 8 | 35.7 | 1.9% | ○ | △ |
| Comparative Example 1 | — | 1.4% | X | △ |
| Comparative Example 2 | — | — | X | X |
| Comparative Example 3 | — | — | X | △ |
| Comparative Example 4 | — | — | X | X |
| Comparative Example 5 | — | — | X | X |

Production of Adhesive Agent 10 parts by mass of the coated particles A (Production Example 1) were added to 100 parts by mass of an epoxy resin (jER828EL, fabricated by Mitsubishi Chemical Corporation), 69 parts by mass of trimethylolpropane tris (3-mercaptopropionate) (TMTP, fabricated by Yodo Kagaku Co., Ltd., the thiol equivalent: 133), and 100 parts by mass of silica (SC5500-SXJ, fabricated by Admatechs Company Limited), followed by stirring with the planetary centrifugal mixer ("THINKY MIXER ARV-310" fabricated by THINKY CORPORATION) to obtain a resin composition. In a procedure in accordance with JIS-K6850, an adhesive test sample of the obtained resin composition was formed by using a polished soft steel plate (JISG3141, SPCC, #120 polishing), and was cured for 30 minutes at 100° C. Then, the tensile lap-shear strength was measured by using a universal testing machine (AC-50KN-CM fabricated by TOYO BALDWIN Co., Ltd.) in the procedure in accordance with JIS-K6850, and was determined to be 23 N/mm2. Thus, the resin composition produced was confirmed useful as an adhesive agent.

Production of Underfill Material 2 parts by mass of the coated particles A were added to an epoxy resin containing 10 parts by mass of jER807 (fabricated by Mitsubishi Chemical Corporation, the epoxy equivalent: 170) and 5.3 parts by mass of EX-216L (fabricated by Nagase ChemteX Corporation, the epoxy equivalent: 135), 27.5 parts by mass of an acid anhydride (HN-2200, fabricated by Hitachi Chemical Co., Ltd.), 50 parts by mass of silica (SC5500-SXJ, fabricated by Admatechs Company Limited, spherical fused silica powder), and 0.5 parts by mass of a silane coupling agent (KBM-403, fabricated by Shin-Etsu Chemical Co., Ltd.), followed by stirring with the planetary centrifugal mixer ("THINKY MIXER ARV-310" fabricated by THINKY CORPORATION) to obtain a resin composition. The viscosity of the obtained resin composition was measured by using the RE80 viscometer (Cone Rotor: 1.34°×R24 manufactured by Toki Sangyo Co., Ltd.) and was determined to be 1000 mPa·s (at a rotor rotation speed: 20 rpm). In addition, using the value obtained at the rotor rotation speed of 2 rpm, a thixotropic ratio was calculated to be 1.1, which confirmed that the resin composition is useful as an underfill material.

Production of Conductive Material 25 parts by mass of the coated particles A (Production Example 1) were added to an epoxy resin containing 15 parts by mass of ZX-1059 (fabricated by NIPPON STEEL & SUMIKIN CHEMICAL CO., LTD., the epoxy equivalent: 165), 30 parts by mass of YDF-8170 (fabricated by NIPPON STEEL & SUMIKIN CHEMICAL CO., LTD., a bisphenol F type epoxy resin, the epoxy equivalent: 160), 10 parts by mass of ZX-1542 (fabricated by NIPPON STEEL & SUMIKIN CHEMICAL CO., LTD., trimethylol propane triglycidyl ether, the epoxy equivalent: 122), 10 parts by mass of X-22-163 (fabricated by Shin-Etsu Chemical Co., Ltd., siloxane glycidyl ether, the epoxy equivalent: 200), and 30 parts by mass of RKB-3040 (fabricated by Resinous Kasei Co., Ltd., a core-shell polymer-containing epoxy resin, 71% by weight of bisphenol A type and bisphenol F type resin, the epoxy equivalent: 230), and also 15 parts by mass of a core-shell polymer (JF-003 fabricated by Mitsubishi Rayon Co., Ltd., acrylic rubber particles), 1.5 parts by mass of a silane coupling agent (KBM-403 fabricated by Shin-Etsu Chemical Co., Ltd.), and 477 parts by mass of silver particles (EA0101 fabricated by Metalor Technologies International SA), followed by stirring with the planetary centrifugal mixer ("THINKY MIXER ARV-310" fabricated by THINKY CORPORATION) to obtain a resin composition. The obtained resin composition was applied to an FR-4 board so as to form a bar-coating with a width of 2 mm, a thickness of 80 μm and a length of 12 mm, and was cured at 130° C. for 60 minutes in a heat circulating oven (DF-610 manufactured by Yamato Scientific Co., Ltd.), thereby forming a test sample for resistivity measurement. The resistance value of the resin composition obtained was measured by using a digital multimeter (R6552 fabricated by ADVANTEST Corporation) in a four-terminal mode at a distance of 100 mm, and then the resistivity was calculated to be $0.5 \times 10^{-3}$ Ω·cm. Moreover, in the procedure in accordance with JIS-K6850, an adhesive test sample of the resin composition was formed by using a copper-clad laminate plate of 100 mm×25 mm×0.8 mm coated with gold plating, and was cured at 130° C. for 60 minutes. Then, the tensile lap-shear strength was measured by using a universal tensile testing machine (RTM-500 fabricated by Orientec Co., Ltd.) in the procedure in accordance with JIS-K6850, and was determined to be 3.1 N/mm². Thus, the resin composition produced was confirmed useful as a conductive material.

Production of Resin Composition for Composite Material 3 parts by mass of the coated particles A were added to an epoxy resin containing 80 parts by mass of jER828EL, 20 parts by mass of MX-125 (fabricated by Kaneka Corporation, 75% by mass of bisphenol A type epoxy resin, 25% by mass of core-shell polymer, a copolymer of core: styrene and butadiene, the epoxy equivalent: 250), and 80 parts by mass of an acid anhydride (HN-2200 fabricated by Hitachi Chemical Co., Ltd.), followed by stirring with the planetary centrifugal mixer ("THINKY MIXER ARV-310" fabricated by THINKY CORPORATION) to obtain a resin composition. The obtained resin composition was cured at 130° C. for 60 minutes in the hot circulating oven to obtain a resin plate having a thickness of 6 mm. Then, a sample for SENB test in accordance with ASTM D5045-99 was formed of the obtained resin plate, and was used as a test sample for fracture toughness measurement. Then, the fracture toughness was measured by using the universal testing machine (AC-50KN-CM fabricated by TOYO BALDWIN Co., Ltd.) in the procedure in accordance with ASTM D5045-99, and was determined to be 1.2 MPa/m^1/2. Thus, the resin composition produced was confirmed useful as a resin composition for a composite material.

Production of Thermally Conductive Material 10 parts by mass of the coated particles A (Production Example 1) were added to 100 parts by mass of an epoxy resin (jER828EL, fabricated by Mitsubishi Chemical Corporation), 69 parts by mass of trimethylolpropane tris (3-mercaptopropionate) (TMTP, fabricated by Yodo Kagaku Co., Ltd.), 5 parts by mass of a silane coupling agent (KBM-403, fabricated by Shin-Etsu Chemical Co., Ltd.), and alumina containing 290 parts by mass of DAW-45 (fabricated by Denka Company Limited, D50=43.3 μm), 290 parts by mass of DAW-05 (fabricated by Denka Company Limited, D50=5.1 μm), and 150 parts by mass of ASFP-20 (fabricated by Denka Company Limited, D50=0.3 μm), followed by stirring with the planetary centrifugal mixer ("THINKY MIXER ARV-310" fabricated by THINKY CORPORATION) to obtain a resin composition. The obtained resin composition was cured at 100° C. for 30 minutes to form a columnar cured body having a diameter of 30 mm and a thickness of 5 mm, which was used as a test sample for thermal conductivity measurement. Then, the thermal conductivity was measured by using a hot disk thermal constants analyzer (TPS2500 fabricated by Kyoto Electronics Manufacturing Co., Ltd.) in a procedure in accordance with ISO 22007-2, and was determined to be 1.5 W/mK. Thus, the resin composition produced was confirmed useful as a thermally conductive material.

INDUSTRIAL APPLICABILITY

The coated particles of the present invention are favorably usable as a curing agent or curing accelerator for an epoxy resin such as an FRP matrix resin. Resin compositions containing the coated particles of the present invention and epoxy resins may be used as epoxy resin materials in the fields such as constructions, civil engineerings, automobiles, vessels, aerospace industries, industrial machineries, robots, communications, electrical and electronics industries, semiconductors, and displays, and may be used as adhesive agents, bonding agents, electrically conductive materials, magnetic materials, thermally conductive materials, insulating materials, encapsulation materials, coating materials, paints, and so on.

The invention claimed is:

1. An epoxy resin composition comprising:
   (i) coated particles comprising:
      (A) curing agent particles for epoxy resin; and
      (B) an alkoxy oligomer,
   wherein the surfaces of said curing agent particles for epoxy resin are coated with said alkoxy oligomer; and
   (ii) an epoxy resin.

2. The resin composition according to claim 1, wherein the (A) curing agent particles for epoxy resin are a latent curing agent.

3. The resin composition according to claim 1, wherein the (A) curing agent particles for epoxy resin are at least one selected from the group consisting of amine-based latent curing agents, urea compounds, dicyandiamide, and hydrazide compounds.

4. The resin composition according to claim 3, wherein the (A) curing agent particles for epoxy resin are at least one amine-based latent curing agent selected from the group consisting of tertiary amine-adduct latent curing agents and imidazole-adduct latent curing agents.

5. The resin composition according to claim 1, wherein an average particle diameter D of the coated particles is not less than 1.0 times to not more than 5.0 times an average particle diameter of the (A) curing agent particles for epoxy resin.

6. The resin composition according to claim 1, wherein an average particle diameter D of the coated particles satisfies 2.5 μm≤D≤12.5 μm.

7. The resin composition according to claim 1, wherein an amount of the (B) alkoxy oligomer is 0.1 to 40% by mass relative to 100% by mass of the (A) curing agent particles for epoxy resin.

8. The resin composition according to claim 1, wherein an amount of the (B) alkoxy oligomer per unit surface area of the (A) curing agent particles for epoxy resin is 0.5 mg/m² or more.

9. The resin composition according to claim 1, wherein a $SiO_2$ content in the coated particles is 0.04 to 11% by mass relative to 100% by mass of the coated particles.

10. The resin composition according to claim 1, wherein the (B) alkoxy oligomer has a viscosity at 25° C. of 10 mm²/s to 200 mm²/s.

11. The resin composition according to claim 1, wherein the (B) alkoxy oligomer is at least one selected from the group consisting of glycidoxy alkyl group-containing alkoxysilyl resins, aminoalkyl group-containing alkoxysilyl resins and mercaptoalkyl group-containing alkoxysilyl resins.

12. The resin composition according to claim 11, wherein the (B) alkoxy oligomer is at least one selected from the group consisting of glycidoxypropyl group-containing alkoxysilyl resins, aminopropyl group-containing alkoxysilyl resins, N-2-(aminoethyl)-3-aminopropyl group-containing alkoxysilyl resins, N-phenyl-3-aminopropyl group-containing alkoxysilyl resins, and mercaptopropyl group-containing alkoxysilyl resins.

13. The resin composition according to claim 12, wherein the (B) alkoxy oligomer is at least one selected from the group consisting of glycidoxypropyl group-containing methoxysilyl resins, aminopropyl group-containing methoxysilyl resins, aminopropyl group-containing ethoxysilyl resins, N-2-(aminoethyl)-3-aminopropyl group-containing methoxysilyl resins, N-phenyl-3-aminopropyl group-containing methoxysilyl resins, and mercaptopropyl group-containing methoxysilyl resins.

14. The resin composition according to claim 1, wherein the (B) alkoxy oligomer is represented by the following general formula (1):

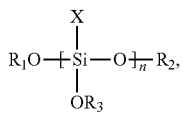

where $R_1$, $R_2$, and $R_3$ are each independently a linear or branched chain alkyl group having 1 to 10 carbon atoms, X is a lower alkyl group, a glycidoxyalkyl group, an aminoalkyl group, or a mercaptoalkyl group, n is an integer of 2 to 10, a plurality of X present may be the same as or different from each other, a plurality of $R_3$ present may be the same as or different from each other, and at least one of the plurality of X is a glycidoxyalkyl group, an aminoalkyl group, or a mercaptoalkyl group.

15. The resin composition according to claim 1, further comprising at least one selected from the group consisting of curing agents, curing accelerators, thermosetting resins, thermoplastic resins, inorganic fillers, organic fillers, thickeners, defoaming agents, leveling agents, adhesion imparting agents, coloring agents, and organic solvents.

16. The resin composition according to claim 1, further comprising an inorganic filler, wherein
    the inorganic filler is at least one selected from the group consisting of silica, electrically conductive fillers, magnetic fillers, and the thermally conductive fillers.

17. The resin composition according to claim 1, wherein the resin composition is a liquid, paste, or film composition.

18. The resin composition according to claim 1, wherein the resin composition is an adhesive agent, a bonding agent, an electrically conductive material, a magnetic material, a thermally conductive material, an insulating materials, an encapsulation material, a coating material, or a paint.

19. A sheet material or a composite material comprising the resin composition according to claim 1.

* * * * *